(12) United States Patent
Paivio et al.

(10) Patent No.: US 12,304,590 B2
(45) Date of Patent: May 20, 2025

(54) VEHICLE TOWING HITCH

(71) Applicant: Mobility Holdings, Ltd., Hong Kong (HK)

(72) Inventors: Pasi Paivio, Hong Kong (HK); Joakim Uimonen, Hong Kong (HK); Antoine Goudrand, Hong Kong (HK); Chao Liang Hsu, Hong Kong (HK)

(73) Assignee: MOBILITY HOLDINGS, LTD., Hong Kong (HK)

( * ) Notice: Subject to any disclaimer, the term of this patent is extended or adjusted under 35 U.S.C. 154(b) by 325 days.

(21) Appl. No.: 17/992,826

(22) Filed: Nov. 22, 2022

(65) Prior Publication Data

US 2024/0166296 A1 May 23, 2024

(51) Int. Cl.
*B62K 27/12* (2006.01)

(52) U.S. Cl.
CPC .................................... *B62K 27/12* (2013.01)

(58) Field of Classification Search
CPC . B60D 2001/003; B62K 27/12; B62K 13/025
See application file for complete search history.

(56) References Cited

U.S. PATENT DOCUMENTS

| | | | | |
|---|---|---|---|---|
| 4,342,467 A * | 8/1982 | Kester | ..................... | B62K 27/12 |
| | | | | 280/475 |
| 8,360,456 B2 * | 1/2013 | Peruzzo | ................. | B62K 27/12 |
| | | | | 280/402 |
| 8,814,193 B2 * | 8/2014 | Barnes | .................... | B62K 27/12 |
| | | | | 280/204 |
| 8,882,123 B1 * | 11/2014 | Gingras | ................. | B62K 27/12 |
| | | | | 280/402 |
| 9,174,699 B2 * | 11/2015 | Lee | ......................... | B62K 27/12 |
| 12,043,340 B2 * | 7/2024 | Chen | .................... | B62K 27/003 |
| 2023/0391417 A1 * | 12/2023 | Dorr | ....................... | B62K 13/02 |

FOREIGN PATENT DOCUMENTS

| | | | | | |
|---|---|---|---|---|---|
| CN | | 109895922 A | * | 6/2019 | |
| DE | | 19548371 A1 | * | 7/1997 | ........... B62K 13/025 |

* cited by examiner

*Primary Examiner* — Valentin Neacsu
*Assistant Examiner* — Hosam Shabara
(74) *Attorney, Agent, or Firm* — Cooper Legal Group LLC

(57) ABSTRACT

A vehicle towing hitch including a U-shaped bracket structure and at least one vehicle receiving assembly is provided. The U-shaped bracket structure is mountable to a bicycle and includes a support plate and pair of opposing parallel arm plates. Each of the pair of opposing parallel arm plates have a fixing portion and supporting portion. Each of the fixing portion is configured to be fixed to a back end of the bicycle and each of the supporting portion and the support plate extend in a direction laterally beyond a length of the bicycle. The at least one vehicle receiving assembly is configured for receiving and securing one portion of at least one vehicle thereto. The at least one vehicle receiving assembly is attached to at least the support plate or one of the supporting portion of the pair of opposing parallel arm plates.

20 Claims, 23 Drawing Sheets

VEHICLE TOWING HITCH

TECHNICAL FIELD

Example embodiments relate generally to the field of vehicle towing and, more particularly, to a vehicle towing hitch for securely towing bicycles, trailers or similar wheeled vehicles behind a bicycle.

BACKGROUND

Cargo bicycles are sturdy bikes which are designed to carry heavier loads and/or two or more passengers. Often, cargo bicycles have a longer wheelbase than standard bicycles, with a space for carrying the heavier loads either in the front or back. Generally, cargo bicycles carrying heavier loads in the back include a rear carrier rack and can be called longtail bikes. Accessories can be integrated with or attached to longtail bikes for customizing specific carrying needs, including passenger bike seats, child bike seats, footboards, cages, boxes, and canopies.

When travelling by bicycle with a child, a parent may not want their child to ride their bike on city streets and prefer their child to ride their bike at a safer place, such as a bike park. In such a scenario, the parent may prefer their child to sit on the back of their bicycle and tow the child's bike behind their bicycle until they reach the bike park. Often, the parent may simply find a way to attach the front wheel of their child's bike to panniers and/or footboards of their bicycle while towing the child's bike, making it difficult for their child to place their feet hanging downward to sides of the rear wheel, to turn their bicycle towing the bike right and left (more rounded turns required), and to avoid scratches or damage of their bicycle and bike when turning and travelling up and down inclines. Another option, may be to place their child's bike into a trailer and then tow the trailer with the child's bike therein to the bike park. Often, trailers are mounted to couplers or adapters attached to a rear wheel axle. Thus, any pannier and/or footboard would need to be removed from their bicycle, making it more dangerous for their child when placing their feet hanging downward to sides of the rear wheel, more time consuming and inconvenient for the parent.

Gravel, potholes, cobbles, washboard gravel, slick roads, and dirt are all unpredictable surfaces to ride a road bicycle on. Riding a mountain bike on a road is slow, laggy, less efficient and tiring. Also, asphalt wears out the knobbly tires of mountain bikes faster than gravel or muddy trails. At times, a bicyclist may desire to travel with two bicycles to a location. When this occurs, the bicyclist may decide to walk with both bicycles, making it time consuming and tiring for the bicyclist. Another option may be for the bicyclist to carry one bike while riding, making it dangerous for the bicyclist and risking damage to either or both bicycles. Yet another option, may be for the bicyclist to push one bike with one hand while riding the other bicycle, also making it dangerous for the bicyclist, risking damage to either or both bicycles, and making it difficult to turn right and left (more rounded turns required) and travel up and down inclines. Yet another option, may be for the bicyclist to attach the front wheel of their bike to panniers and/or footboards of their bicycle while towing one bike, also, making it difficult to turn their bicycle towing the bike right and left (more rounded turns required), and avoid scratches or damage of their bicycle and bike when turning and travelling up and down inclines. Yet another option, may be to place their bike into a trailer and then tow the trailer with their bike therein to the bike park. Often, trailers are mounted to couplers or adapters attached to a rear wheel axle. Thus, also, any panniers and/or footboard would need to be removed from their bicycle, making it more time consuming and inconvenient for the bicyclist.

SUMMARY

Various aspects of the present disclosure provide a vehicle towing hitch for towing a vehicle.

According to one aspect of the present disclosure, a vehicle towing hitch including a U-shaped bracket structure and at least one vehicle receiving assembly is provided. The U-shaped bracket structure is configured for mounting to a bicycle. The U-shaped bracket structure includes a support plate and a pair of opposing parallel arm plates. The pair of opposing parallel arm plates extend perpendicular from two opposing peripheral edges of the support plate. Each of the pair of opposing parallel arm plates have a fixing portion and a supporting portion. The supporting portion extend perpendicular from the opposing peripheral edges of the support plate. Each of the fixing portion is configured to be fixed to a back end of the bicycle and each of the supporting portion and the support plate extend in a direction laterally beyond a length of the bicycle. The at least one vehicle receiving assembly is configured for receiving and securing one portion of at least one vehicle to the at least one vehicle receiving assembly. The at least one vehicle receiving assembly is attached to at least the support plate or one of the supporting portion of the pair of opposing parallel arm plates.

According to another aspect of the present disclosure, a shape of the support plate is an elongated octagonal shape and the U-shaped bracket structure further includes a pair of opposing parallel arm strengthening plates and a U-shaped strengthening top plate. The pair of opposing parallel arm strengthening plates and the U-shaped strengthening top plate all extend perpendicular from three peripheral edges of the support plate between the opposing peripheral edges of the pair of opposing parallel arm plates. A second edge of each of the pair of opposing parallel arm strengthening plates extends from a third edge of each of the pair of opposing parallel arm plates and at least a portion of a third edge of each of the pair of opposing parallel arm strengthening plates extends from second edges of the U-shaped strengthening top plate. The pair of opposing parallel arm strengthening plates and the U-shaped strengthening top plate together increase stiffness of the vehicle towing hitch when the at least one vehicle receiving assembly receives forces from the one portion of the at least one vehicle when stopping, starting, turning and travelling up and down inclines.

According to another aspect of the present disclosure, each of the fixing portion includes at least two fixing holes separated by a distance and at least two corresponding fixing elements. The bicycle is at least one of a pedal, pedal-based electric assist or electric bicycle, wherein the back end of the bicycle is a frame portion of the bicycle configured to receive the vehicle towing hitch. The at least one vehicle is a towed bicycle and the towed bicycle is at least one of a pedal, pedal-based electric assist or electric bicycle, wherein the one portion of the at least one vehicle is a first front fork. Each of the at least two corresponding fixing elements fix the U-shaped bracket structure to the frame portion through each of the at least two fixing holes. The first front fork is mounted to the at least one vehicle receiving assembly.

According to yet another aspect of the present disclosure, the support plate includes at least a first set of four assembly holes and the at least one vehicle receiving assembly includes a first conversion shaft sleeve, a first pair of axle adapters, a pair of L-shaped mounts, and a first thru-axle quick release front fork clamp. Each pair of L-shaped mounts includes an assembly portion having two fastening holes separated by a distance and two corresponding fastening elements and a mounting portion extending perpendicular from an edge of the assembly portion, the mounting portion including one through hole. A size of a core diameter of the first pair of axle adapters is the same as a size of a diameter of a thru-axle of the first thru-axle quick release front fork clamp. One end of each of the first pair of axle adapters, correspond partially within opposing openings of the first conversion shaft sleeve and the other end of each of the first pair of axle adapters, correspond partially within and through the one through hole of the mounting portion. The two corresponding fastening elements of each of the pair of L-shaped mounts assemble the pair of L-shaped mounts, the first pair of axle adapters, and the first conversion shaft sleeve to the support plate through two of the at least a first set of four assembly holes, respectively. The first thru-axle quick release front fork clamp is assembled through each of the one through hole of the mounting portion, the first pair of axle adapters, and the first conversion shaft sleeve. The first thru-axle quick release front fork clamp is configured to clamp the first front fork to the at least one vehicle receiving assembly.

According to further yet another aspect of the present disclosure, the support plate further includes a second set of four assembly holes, the at least one vehicle receiving assembly further includes a second conversion shaft sleeve, a second pair of axle adapters, and a second thru-axle quick release front fork clamp, and the one portion of the at least one vehicle is a second front fork having a different axle length than the first front fork. The second set of four assembly holes are disposed between the first set of four assembly holes or disposed on outer sides of the first set of four assembly holes. A length of the second conversion shaft sleeve is different from a length of the first conversion shaft sleeve, and a size of a core diameter of the second pair of axle adapters and a size of a diameter of a thru-axle of the second thru-axle quick release front fork clamp is different from the size of the core diameter of the first pair of axle adapters and the size of the diameter of the thru-axle of the first thru-axle quick release front fork clamp. The second conversion shaft sleeve, the second pair of axle adapters, and the second thru-axle quick release front fork clamp, is interchangeable with the first conversion shaft sleeve, the first pair of axle adapters, and the first thru-axle quick release front fork clamp. The two corresponding fastening elements of each of the pair of L-shaped mounts assemble the pair of L-shaped mounts, the second conversion shaft sleeve and, the second pair of axle adapters and the second thru-axle quick release front fork clamp or the first pair of axle adapters and the first thru-axle quick release front fork clamp, to the support plate through two of the at least a second set of four assembly holes, respectively, when a length of the second conversion shaft sleeve is shorter than a length of the first conversion shaft sleeve or a length of the second conversion shaft sleeve is longer than a length of the first conversion shaft sleeve. The second thru-axle quick release front fork clamp or the first thru-axle quick release front fork clamp is assembled through each of the one through hole of the mounting portion, the second conversion shaft sleeve, and the second pair of axle adapters or the first pair of axle adapters, respectively. The second thru-axle quick release front fork clamp and the first thru-axle quick release front fork clamp is configured to clamp a second front fork to the at least one vehicle receiving assembly.

According to further yet another aspect of the present disclosure, the assembly portion of at least one of the pair of L-shaped mounts is assembled to the support plate facing a center of the support plate or the assembly portion of at least one of the pair of L-shaped mounts is assembled to the support plate facing an edge of the support plate, or any combination of the foregoing. The direction of assembly of the assembly portion avoids contact of a portion of the first front fork or second front fork with any of the two corresponding fastening elements of each of the pair of L-shaped mounts when the first front fork or second front fork, respectfully, rotates when traveling up and down inclines.

According to another aspect of the present disclosure, each of the fixing portion includes at least two fixing holes separated by a distance and at least two corresponding fixing elements. The bicycle is at least one of a pedal, pedal-based electric assist or electric bicycle, wherein the back end of the bicycle is a frame portion of the bicycle configured to receive the vehicle towing hitch. The at least one vehicle is trailer and the trailer is at least one of a towed people trailer or cargo trailer and the one portion of the at least one vehicle is a tow arm. Each of the at least two corresponding fixing elements fix the U-shaped bracket structure to the frame portion through each of the at least two fixing holes, and the tow arm is mounted to the at least one vehicle receiving assembly.

According to yet another aspect of the present disclosure, at least one of the supporting portion of the pair of opposing parallel arm plates includes at least a side assembly hole and the at least one vehicle receiving assembly includes a coupler having a coupler through hole, a coupler fastening element, and a retaining pin. The coupler fastening element assembles the coupler to the side assembly hole through the coupler through hole. The coupler is configured to receive the tow arm and the retaining pin is configured to fix the tow arm to the at least one vehicle receiving assembly.

According to further yet another aspect of the present disclosure, the bicycle further includes a rear carrier rack above a rear wheel. A height of the vehicle towing hitch, fixed to the frame portion, and a length of each of the supporting portion and the support plate, extending in a direction laterally beyond the length of the bicycle, is configured such that when traveling up and down inclines and towing the towed bicycle, and a mounted angle of a first front fender of the first front fork or a second front fender of the second front fork to a center of the vehicle towing hitch parallel to the ground is at least 95 degrees, the first front fender or the second front fender has at least a 35 degree rotational allowance angle before contacting the rear carrier rack of the bicycle.

According to further yet another aspect of the present disclosure, the bicycle further includes a pair of panniers on opposing sides of a rear wheel. A height of the vehicle towing hitch, fixed to the frame portion, and a length of each of the supporting portion and the support plate, extending in a direction laterally beyond the length of the bicycle, is configured such that when the bicycle is turning left or right and towing the trailer, and a rotational operational angle of the tow arm when towing is 120 degrees, the tow arm has at least a 45 degree rotational operational angle left or right before contacting either of the pair of panniers of the bicycle or the supporting portion of either of the pair of opposing parallel arm plates.

According to another aspect of the present disclosure, a bicycle including a vehicle towing hitch is provided. The bicycle is at least one of a pedal, pedal-based electric assist or electric bicycle, and the bicycle at least has a frame portion configured to receive the vehicle towing hitch. The vehicle towing hitch includes a U-shaped bracket structure and at least one vehicle receiving assembly. The U-shaped bracket structure is configured for mounting to a bicycle. The U-shaped bracket structure includes a support plate and a pair of opposing parallel arm plates. The pair of opposing parallel arm plates extend perpendicular from two opposing peripheral edges of the support plate. Each of the pair of opposing parallel arm plates have a fixing portion and a supporting portion. The supporting portion extend perpendicular from the opposing peripheral edges of the support plate. Each of the fixing portion is configured to be fixed to a back end of the bicycle and each of the supporting portion and the support plate extend in a direction laterally beyond a length of the bicycle. The at least one vehicle receiving assembly is configured for receiving and securing one portion of at least one vehicle to the at least one vehicle receiving assembly. The at least one vehicle receiving assembly is attached to at least the support plate or one of the supporting portion of the pair of opposing parallel arm plates.

According to yet another aspect of the present disclosure of the bicycle, a shape of the support plate is an elongated octagonal shape and the U-shaped bracket structure further includes a pair of opposing parallel arm strengthening plates and a U-shaped strengthening top plate. The pair of opposing parallel arm strengthening plates and the U-shaped strengthening top plate all extend perpendicular from three peripheral edges of the support plate between the opposing peripheral edges of the pair of opposing parallel arm plates. A second edge of each of the pair of opposing parallel arm strengthening plates extends from a third edge of each of the pair of opposing parallel arm plates and at least a portion of a third edge of each of the pair of opposing parallel arm strengthening plates extends from second edges of the U-shaped strengthening top plate. The pair of opposing parallel arm strengthening plates and the U-shaped strengthening top plate together increase stiffness of the vehicle towing hitch when the at least one vehicle receiving assembly receives forces from the one portion of the at least one vehicle when stopping, starting, turning and travelling up and down inclines.

According to yet another aspect of the present disclosure of the bicycle, each of the fixing portion includes at least two fixing holes separated by a distance and at least two corresponding fixing elements, and the at least one vehicle is a towed bicycle and the towed bicycle is at least one of a pedal, pedal-based electric assist or electric bicycle, wherein the one portion of the at least one vehicle is a first front fork. Each of the at least two corresponding fixing elements fix the U-shaped bracket structure to the frame portion through each of the at least two fixing holes. The first front fork is mounted to the at least one vehicle receiving assembly.

According to further yet another aspect of the present disclosure of the bicycle, the support plate includes at least a first set of four assembly holes, and the at least one vehicle receiving assembly includes a first conversion shaft sleeve, a first pair of axle adapters, a pair of L-shaped mounts, and a first thru-axle quick release front fork clamp. Each pair of L-shaped mounts includes an assembly portion having two fastening holes separated by a distance and two corresponding fastening elements and a mounting portion extending perpendicular from an edge of the assembly portion, the mounting portion including one through hole. A size of a core diameter of the first pair of axle adapters is the same as a size of a diameter of a thru-axle of the first thru-axle quick release front fork clamp. One end of each of the first pair of axle adapters, correspond partially within opposing openings of the first conversion shaft sleeve, and the other end of each of the first pair of axle adapters, correspond partially within and through the one through hole of the mounting portion. The two corresponding fastening elements of each of the pair of L-shaped mounts assemble the pair of L-shaped mounts, the first pair of axle adapters, and the first conversion shaft sleeve to the support plate through two of the at least a first set of four assembly holes, respectively. The first thru-axle quick release front fork clamp is assembled through each of the one through hole of the mounting portion, the first pair of axle adapters, and the first conversion shaft sleeve. The first thru-axle quick release front fork clamp is configured to clamp the first front fork to the at least one vehicle receiving assembly.

According to further yet another aspect of the present disclosure of the bicycle, the support plate further includes a second set of four assembly holes, the at least one vehicle receiving assembly further includes a second conversion shaft sleeve, a second pair of axle adapters, and a second thru-axle quick release front fork clamp, and the one portion of the at least one vehicle is a second front fork having a different axle length than the first front fork. The second set of four assembly holes are disposed between the first set of four assembly holes or disposed on outer sides of the first set of four assembly holes. A length of the second conversion shaft sleeve is different from a length of the first conversion shaft sleeve, and a size of a core diameter of the second pair of axle adapters and a size of a diameter of a thru-axle of the second thru-axle quick release front fork clamp is different from the size of the core diameter of the first pair of axle adapters and the size of the diameter of the thru-axle of the first thru-axle quick release front fork clamp. The second conversion shaft sleeve, the second pair of axle adapters, and the second thru-axle quick release front fork clamp, is interchangeable with the first conversion shaft sleeve, the first pair of axle adapters, and the first thru-axle quick release front fork clamp. The two corresponding fastening elements of each of the pair of L-shaped mounts assemble the pair of L-shaped mounts, the second conversion shaft sleeve and, the second pair of axle adapters and the second thru-axle quick release front fork clamp or the first pair of axle adapters and the first thru-axle quick release front fork clamp, to the support plate through two of the at least a second set of four assembly holes, respectively, when a length of the second conversion shaft sleeve is shorter than a length of the first conversion shaft sleeve or a length of the second conversion shaft sleeve is longer than a length of the first conversion shaft sleeve. The second thru-axle quick release front fork clamp or the first thru-axle quick release front fork clamp is assembled through each of the one through hole of the mounting portion, the second conversion shaft sleeve, and the second pair of axle adapters or the first pair of axle adapters, respectively. The second thru-axle quick release front fork clamp and the first thru-axle quick release front fork clamp is configured to clamp a second front fork to the at least one vehicle receiving assembly.

According to further yet another aspect of the present disclosure of the bicycle, the assembly portion of at least one of the pair of L-shaped mounts is assembled to the support plate facing a center of the support plate or the assembly portion of at least one of the pair of L-shaped mounts is assembled to the support plate facing an edge of the support plate, or any combination of the foregoing. The direction of assembly of the assembly portion avoids contact of a portion of the first front fork or second front fork with any of the two corresponding fastening elements of each of the pair of L-shaped mounts when the first front fork or second front fork, respectfully, rotates when traveling up and down inclines.

According to yet another aspect of the present disclosure of the bicycle, each of the fixing portion includes at least two fixing holes separated by a distance and at least two corresponding fixing elements, and the at least one vehicle is trailer and the trailer is at least one of a towed people trailer or cargo trailer and the one portion of the at least one vehicle is a tow arm. Each of the at least two corresponding fixing elements fix the U-shaped bracket structure to the frame portion through each of the at least two fixing holes, and the tow arm is mounted to the at least one vehicle receiving assembly.

According to further yet another aspect of the present disclosure of the bicycle, at least one of the supporting portion of the pair of opposing parallel arm plates includes at least a side assembly hole and the at least one vehicle receiving assembly includes a coupler having a coupler through hole, a coupler fastening element, and a retaining pin. The coupler fastening element assembles the coupler to the side assembly hole through the coupler through hole. The coupler is configured to receive the tow arm and the retaining pin is configured to fix the tow arm to the at least one vehicle receiving assembly.

According to further yet another aspect of the present disclosure of the bicycle, the bicycle further includes a rear carrier rack above a rear wheel. A height of the vehicle towing hitch, fixed to the frame portion, and a length of each of the supporting portion and the support plate, extending in a direction laterally beyond the length of the bicycle, is configured such that when traveling up and down inclines and towing the towed bicycle, and a mounted angle of a first front fender of the first front fork or a second front fender of the second front fork to a center of the vehicle towing hitch parallel to the ground is at least 95 degrees, the first front fender or the second front fender has at least a 35 degree rotational allowance angle before contacting the rear carrier rack of the bicycle.

According to further yet another aspect of the present disclosure of the bicycle, the bicycle further includes a pair of panniers on opposing sides of a rear wheel. A height of the vehicle towing hitch, fixed to the frame portion, and a length of each of the supporting portion and the support plate, extending in a direction laterally beyond the length of the bicycle, is configured such that when the bicycle is turning left or right and towing the trailer, and a rotational operational angle of the tow arm when towing is 120 degrees, the tow arm has at least a 45 degree rotational operational angle left or right before contacting either of the pair of panniers of the bicycle or the supporting portion of either of the pair of opposing parallel arm plates.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those of ordinary skill in the relevant art and having the benefit of this disclosure.

DETAILED DESCRIPTION

The following describes various principles related to vehicle towing hitches by way of reference to specific examples of vehicle towing hitches for towing vehicles, including specific arrangements and examples of U-shaped bracket structures, and at least one vehicle receiving assembly embodying innovative concepts. More particularly, but not exclusively, such innovative principles are described in relation to selected examples of support plates, parallel arm plates, conversion shaft sleeves, axle adapters, L-shaped mounts, thru-axle quick release front fork clamps, and couplers and well-known functions or constructions are not described in detail for purposes of succinctness and clarity. Nonetheless, one or more of the disclosed principles can be incorporated in various other embodiments of support plates, parallel arm plates, conversion shaft sleeves, axle adapters, L-shaped mounts, thru-axle quick release front fork clamps, and couplers to achieve any of a variety of desired outcomes, characteristics, and/or performance criteria.

Thus, vehicle towing hitches for towing vehicles having attributes that are different from those specific examples discussed herein can embody one or more of the innovative principles, and can be used in applications not described herein in detail. Accordingly, embodiments not described herein in detail also fall within the scope of this disclosure, as will be appreciated by those of ordinary skill in the relevant art following a review of this disclosure.

Example embodiments as disclosed herein are directed to vehicle towing hitches for towing vehicles including a U-shaped bracket structure and at least one vehicle receiving assembly. The U-shaped bracket structure is mountable to a bicycle and includes a support plate and pair of opposing parallel arm plates. Each of the pair of opposing parallel arm plates have a fixing portion and supporting portion. Each of the fixing portion is configured to be fixed to a back end of the bicycle and each of the supporting portion and the support plate extend in a direction laterally beyond a length of the bicycle. The vehicle receiving assembly is configured for receiving and securing one portion of at a vehicle thereto. The at least one vehicle receiving assembly is attached to at least the support plate or one of the supporting portion of the pair of opposing parallel arm plates. The vehicle receiving assembly may be configured or interchanged for receiving and securing one portion of road bikes, triathlon bikes, mountain bikes, cargo bikes, hybrid bikes, electric bikes, BMX bikes, or kids bikes or people trailers or cargo trailers.

Figure 1A:
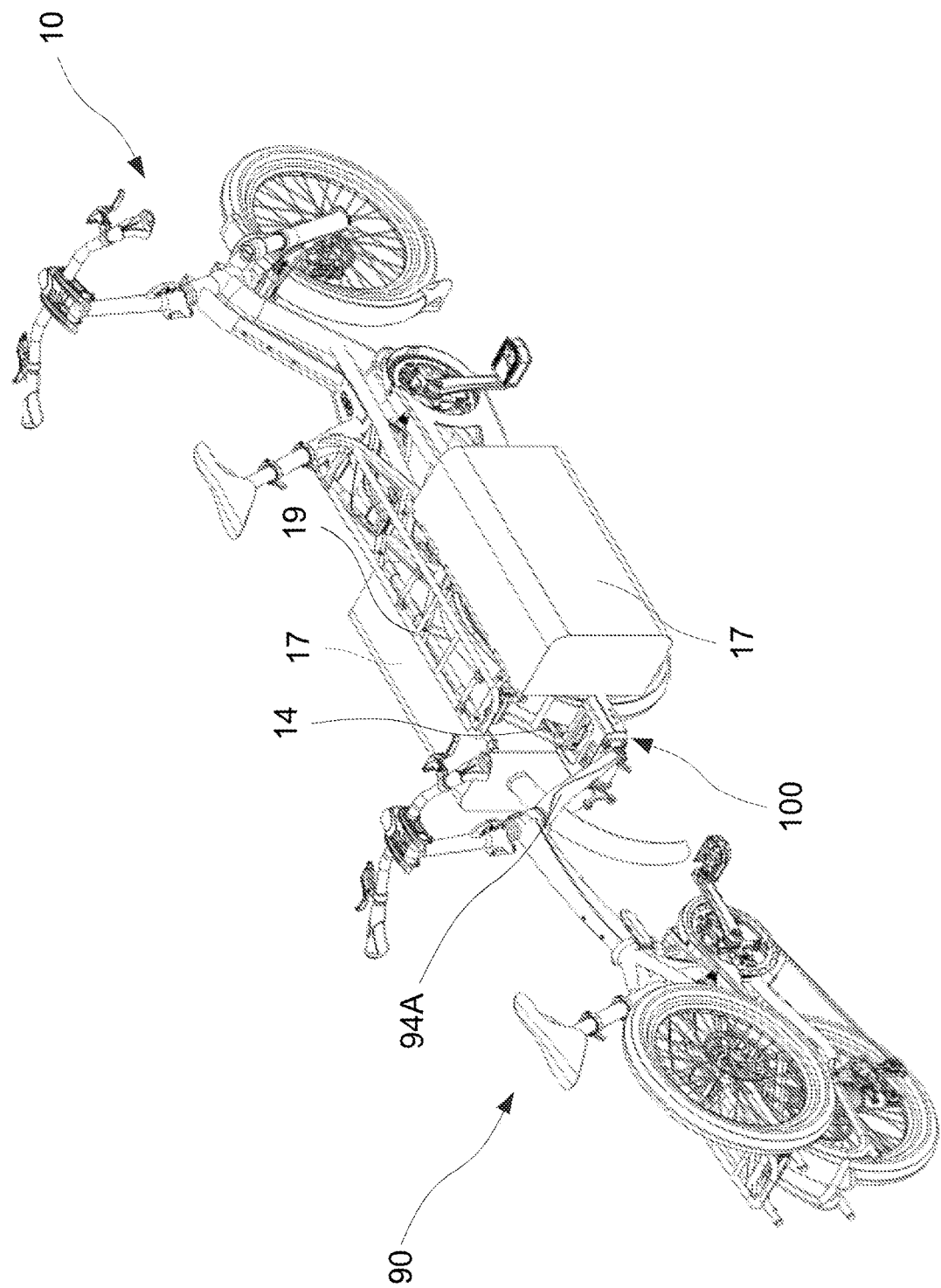
FIG. 1A illustrates a perspective view of a vehicle towing hitch, towing a vehicle while assembled to a bicycle, according to disclosed embodiments.
Figure 1B:
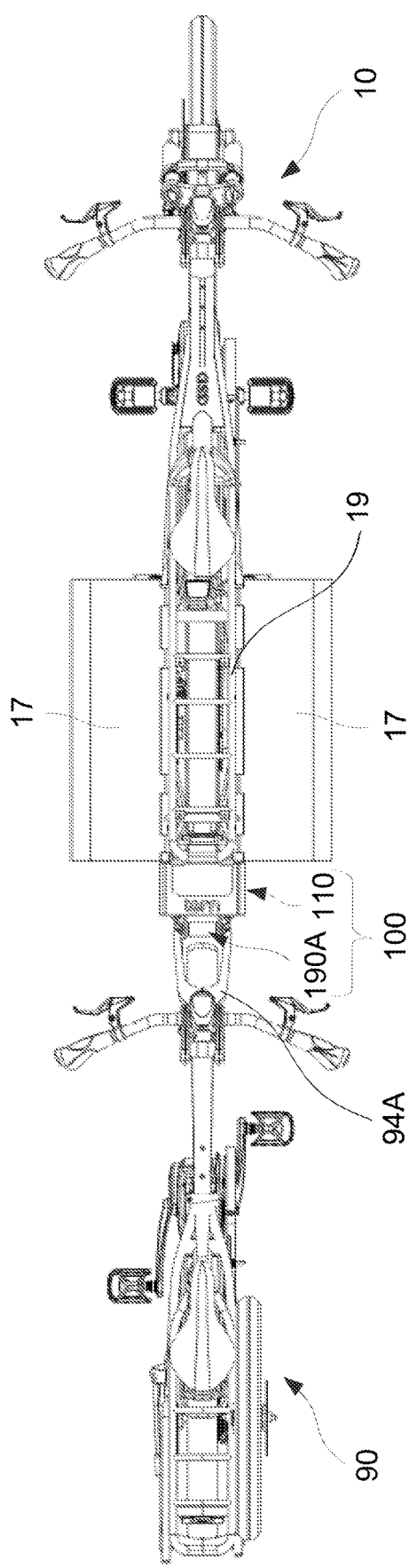
FIG. 1B illustrates a perspective top view of the vehicle towing hitch of FIG. 1A, towing a vehicle while assembled to a bicycle, according to disclosed embodiments.
Figure 1C:
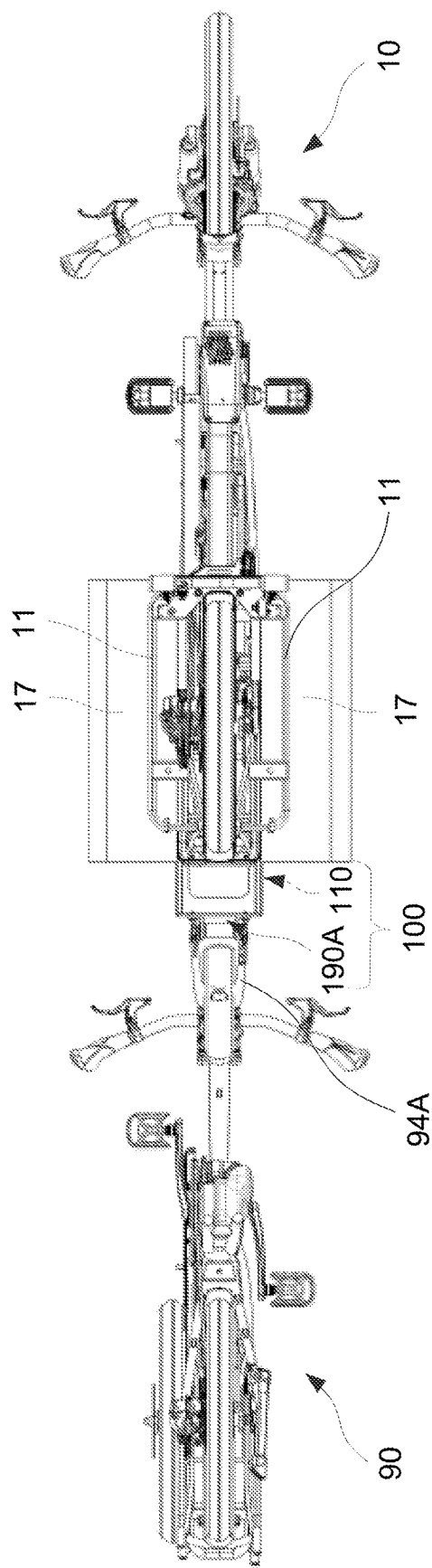
FIG. 1C illustrates a perspective bottom view of the vehicle towing hitch of FIG. 1A, towing a vehicle while assembled to a bicycle, according to disclosed embodiments.

FIG. 1A illustrates a perspective view of a vehicle towing hitch 100, towing a vehicle 90 while assembled to a bicycle 10, according to disclosed embodiments. FIG. 1B illustrates a perspective top view of the vehicle towing hitch 100 of FIG. 1A, towing a vehicle 90 while assembled to a bicycle 10, according to disclosed embodiments. FIG. 1C illustrates a perspective bottom view of the vehicle towing hitch 100 of FIG. 1A, towing a vehicle 90 while assembled to a bicycle 10, according to disclosed embodiments. As illustrated in FIGS. 1A to 1C, a vehicle towing hitch 100 includes a U-shaped bracket structure 110 and at least one vehicle receiving assembly 190A. The U-shaped bracket structure 110 is configured for mounting to the bicycle 10 and towing a vehicle 90 therebehind.

Figure 2:
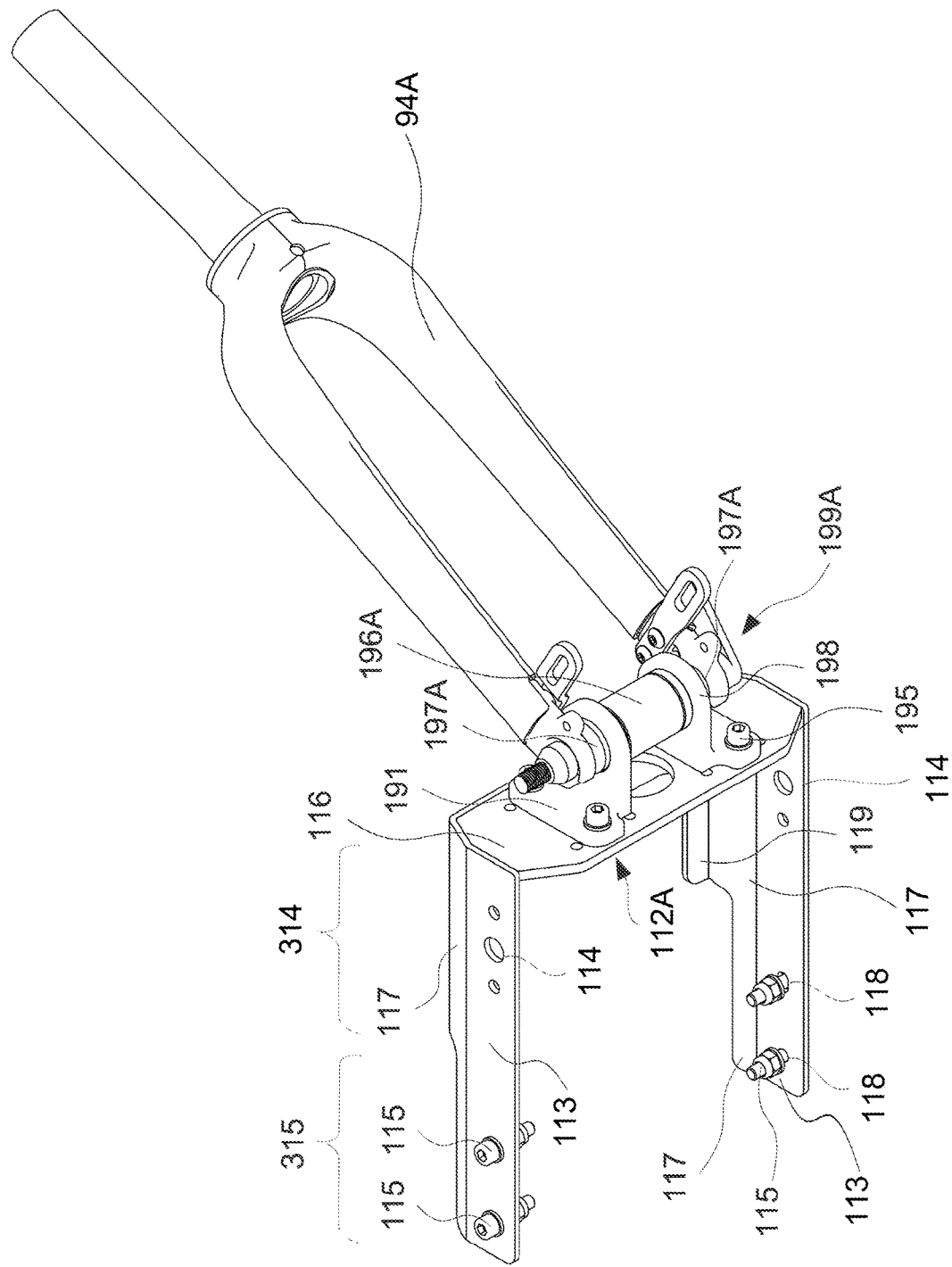
FIG. 2 illustrates a perspective view of a vehicle towing hitch, securing a first front fork thereto, according to disclosed embodiments.
Figure 3:
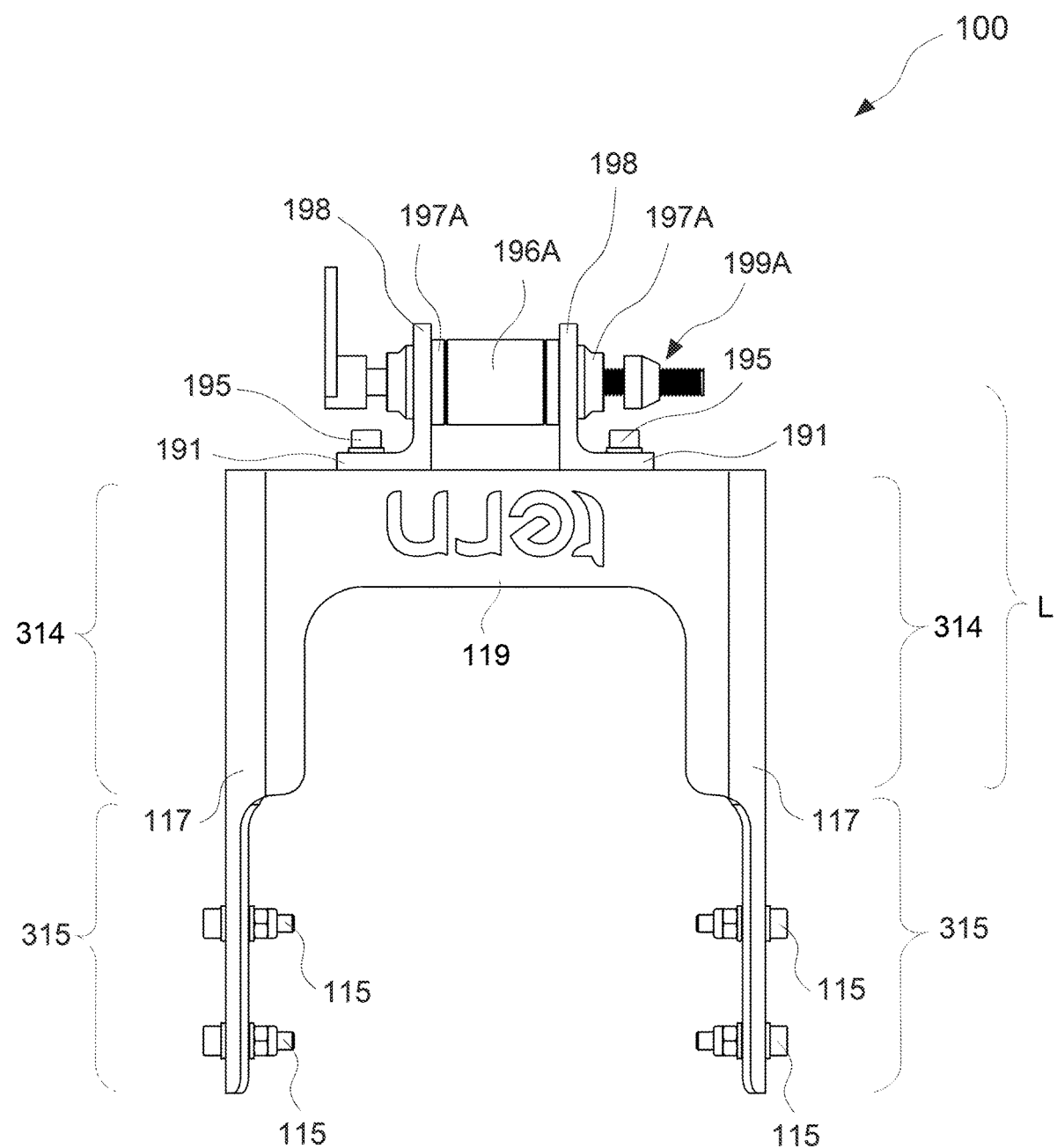
FIG. 3 illustrates a perspective view of another vehicle towing hitch, according to disclosed embodiments.

FIG. 2 illustrates a perspective view of a vehicle towing hitch 100, securing a first front fork 94A thereto, according to disclosed embodiments. FIG. 3 illustrates a perspective view of another vehicle towing hitch 100, according to disclosed embodiments. As illustrated in FIGS. 2 and 3, the U-shaped bracket structure 110 includes a support plate 116 and a pair of opposing parallel arm plates 113/113. In the illustrated embodiments, a shape of the U-shaped bracket structure 110 is generally an open shaped rectangle and a shape of each of the pair of opposing parallel arm plates 113/113 is rectangular shaped. The pair of opposing parallel arm plates 113/113 extend perpendicular from two opposing peripheral edges of the support plate 116. Each of the pair of opposing parallel arm plates 113/113 have a fixing portion 315/315 and a supporting portion 314/314. The supporting portion 314/314 extend perpendicular from the opposing peripheral edges of the support plate 116. Each of the fixing portion 315/315 is configured to be fixed to a back end 14 of the bicycle 10 and, as illustrated in FIGS. 1A to 1C, each of the supporting portion 314/314 and the support plate 116 extend in a direction laterally beyond a length of the bicycle 10. The at least one vehicle receiving assembly 190A is configured for receiving and securing one portion 94A of at least one vehicle 90 to the at least one vehicle receiving assembly 190A. The at least one vehicle receiving assembly 190A is attached to at least the support plate 116 or one of the supporting portion 314/314 of the pair of opposing parallel arm plates 113/113. When the at least one vehicle receiving assembly 190A is attached to the support plate 116, the at least one vehicle receiving assembly 190A extend in a direction laterally beyond a length of the each of the supporting portion 314/314 and the support plate 116.

In the illustrated embodiments, the bicycle 10 may be any type of pedal, pedal-based electric assist or electric bicycle. For illustration, a cargo bicycle 10 is shown. However, in practice, the bicycle 10 may be varied. As long as the back end 14 of the bicycle 10 has a frame portion 14 configured to receive the vehicle towing hitch 100. The cargo bicycle 10 has a frame, a front fork, a front wheel mounted to the front fork, a rear wheel 11 mounted to the frame, a frame portion 14 configured to receive the vehicle towing hitch 100, and a steering assembly having a handlebar assembled to the front fork and journaled to the frame. The cargo bicycle 10 may further have a rear carrier rack connected to the frame near to the rear wheel 11, a pair of footboards 11/11, and a pair of panniers 17/17.

In the illustrated embodiments, the at least one vehicle 90 being towed may be any type of pedal, pedal-based electric assist or electric bicycle. For illustration, a towed cargo bicycle 90 is shown. However, in practice, the at least one vehicle 90 which is a towed cargo bicycle 90 may be varied; as examples, road bikes, triathlon bikes, mountain bikes, hybrid bikes, electric bikes, BMX bikes, or kids bike, or the like having various frame types and sizes and the embodiments are not limited thereto. As long as the one portion 94A of the at least one vehicle 90 has a first front fork 94A mountable to the at least one vehicle receiving assembly 190A of the vehicle towing hitch 100.

As illustrated in FIGS. 2 and 3, each of the fixing portion 315/315 includes at least two fixing holes 118/118 separated by a distance and at least two corresponding fixing elements 115/115. In the illustrated embodiments, the at least two corresponding fixing elements 115/115 is a nut and bolt with washers; however, the embodiments are not limited thereto. Any type of fastener may be implemented, as long as each of the at least two corresponding fixing elements 115/115 fix the U-shaped bracket structure 110 to the frame portion 14 through each of the at least two fixing holes 118/118. Additionally, other means of fastening the U-shaped bracket structure 110 to the frame portion 14 of the bicycle 10 may be implemented. As an example, each of the pair of opposing parallel arm plates 113/113 may have rails (not shown) thereon which correspond to tracks (not shown) of the frame portion 14, secured by one fixing element (not shown). As long as fixing of the U-shaped bracket structure 110 to the frame portion 14 expands a distance greater than one fixing hole 118.

Figure 4A:
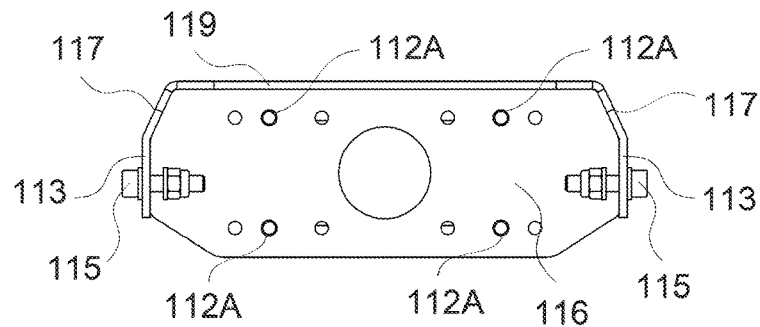
FIG. 4A illustrates a perspective view of a U-shaped bracket structure of a vehicle towing hitch, having a pair of L-shaped mounts assembled thereto, according to disclosed embodiments.
Figure 4B:
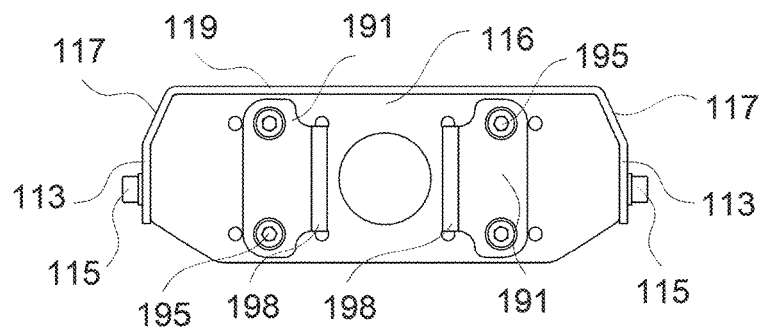
FIG. 4B illustrates another perspective view of the U-shaped bracket structure of FIG. 4A, having a pair of L-shaped mounts assembled thereto, according to disclosed embodiments.

FIG. 4A illustrates a perspective view of a U-shaped bracket structure 110 of a vehicle towing hitch 100, having a pair of L-shaped mounts 193/193 assembled thereto, according to disclosed embodiments. FIG. 4B illustrates another perspective view of the U-shaped bracket structure 110 of FIG. 4A, having a pair of L-shaped mounts 193/193 assembled thereto, according to disclosed embodiments. As illustrated in FIGS. 4A to 4B, a shape of the support plate 116 is an elongated octagonal shape and the U-shaped bracket structure 110 further includes a pair of opposing parallel arm strengthening plates 117/117 and a U-shaped strengthening top plate 119. In the illustrated embodiments, a shape of the U-shaped strengthening top plate 119 is generally U-shaped with a thicker base and a shape of each of the pair of opposing parallel arm strengthening plates 117/117 is rectangular shaped. The pair of opposing parallel arm strengthening plates 117/117 and the U-shaped strengthening top plate 119 all extend perpendicular from three peripheral edges of the support plate 116 between the opposing peripheral edges of the pair of opposing parallel arm plates 113/113. A second edge of each of the pair of opposing parallel arm strengthening plates 117/117 extends from a third edge of each of the pair of opposing parallel arm plates 113/113 and at least a portion of a third edge of each of the pair of opposing parallel arm strengthening plates 117/117 extends from second edges of the U-shaped strengthening top plate 119. The pair of opposing parallel arm strengthening plates 117/117 and the U-shaped strengthening top plate 119 together increase stiffness of the vehicle towing hitch 100 when the at least one vehicle receiving assembly 190A receives forces from the one portion 94A of the at least one vehicle 90 when stopping, starting, turning and travelling up and down inclines. The stiffness of the vehicle towing hitch 100 is greater with the pair of opposing parallel arm strengthening plates 117/117 and the U-shaped strengthening top plate 119 than, as an example, if only a U-shaped strengthening top plate was implemented.

Figure 4C:
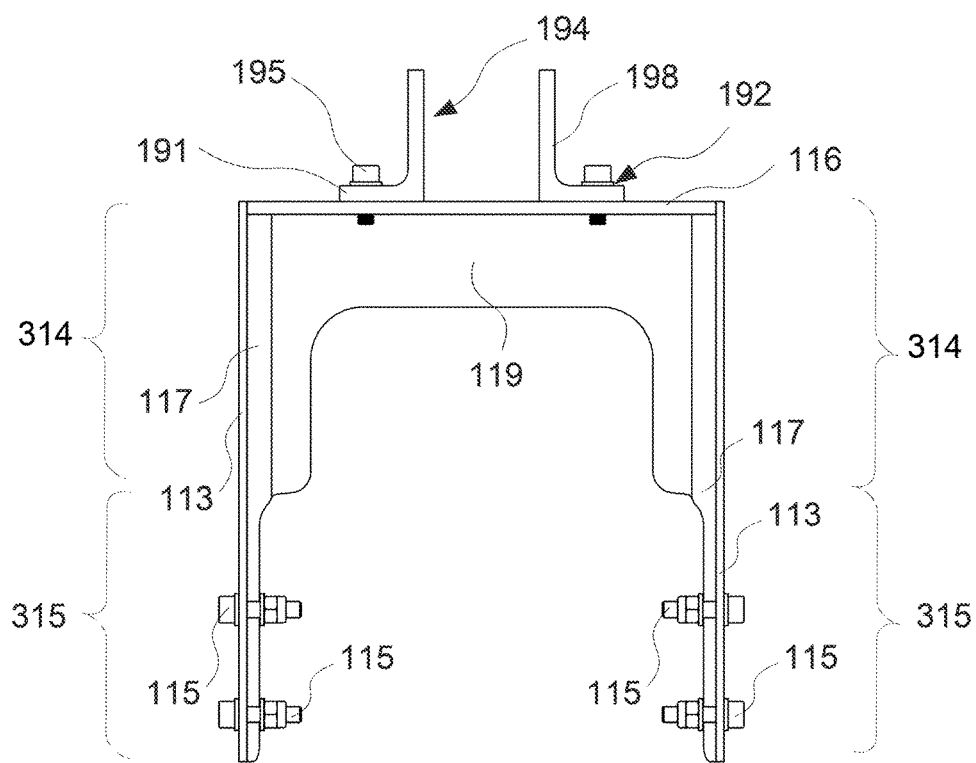
FIG. 4C illustrates yet another perspective view of the U-shaped bracket structure of FIG. 4A, having a pair of L-shaped mounts assembled thereto, according to disclosed embodiments.
Figure 4D:
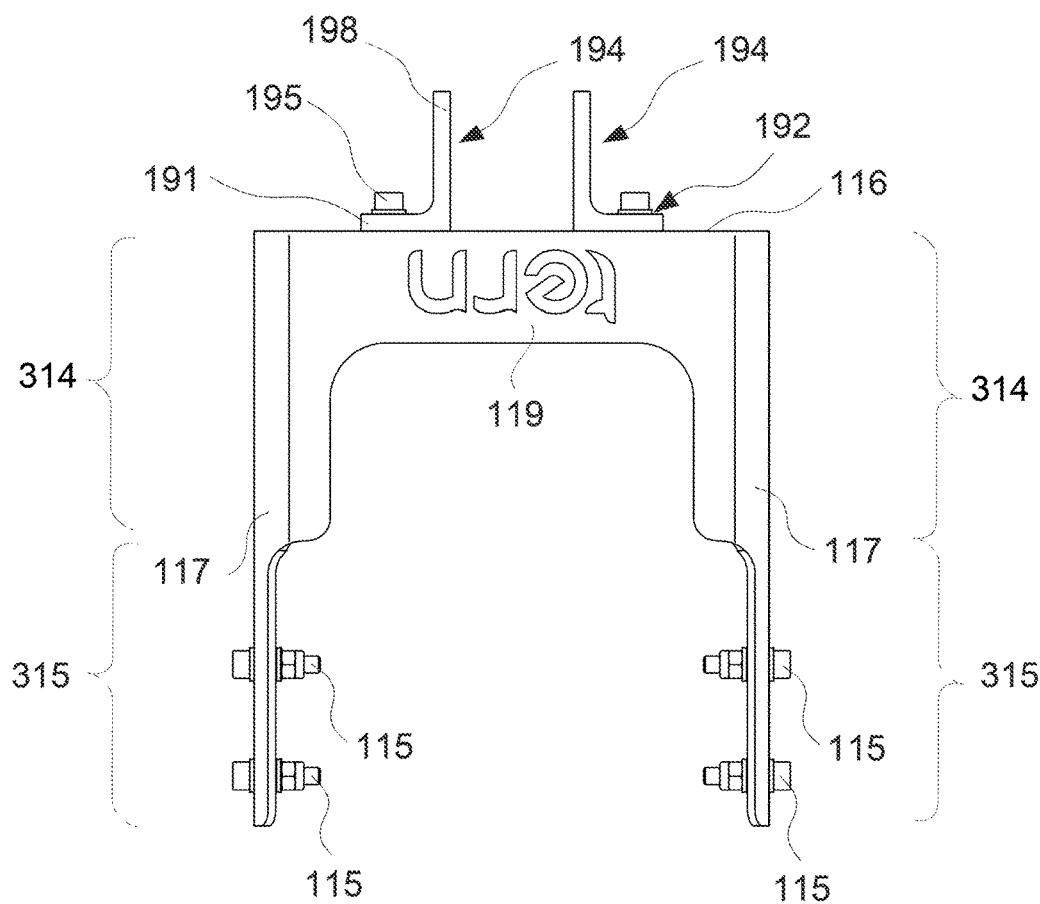
FIG. 4D illustrates yet another perspective view of the U-shaped bracket structure of FIG. 4A, having a pair of L-shaped mounts assembled thereto, according to disclosed embodiments.
Figures 5, 6:
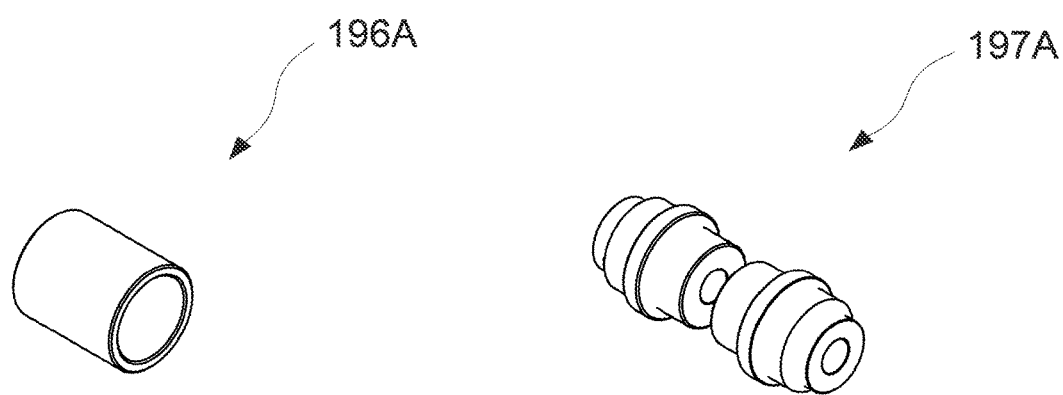
FIG. 5 illustrates a perspective view of a first conversion shaft sleeve of at least one vehicle receiving assembly of a vehicle towing hitch, according to disclosed embodiments.
FIG. 6 illustrates a perspective view of a pair of axle adapters of at least one vehicle receiving assembly of a vehicle towing hitch, according to disclosed embodiments.
Figure 7:
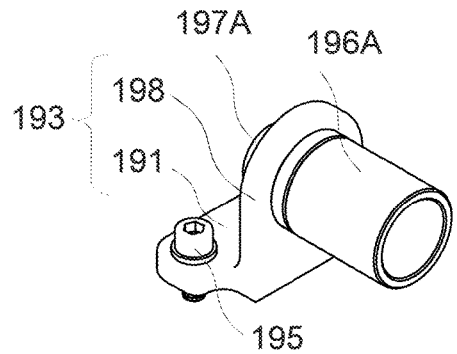
FIG. 7 illustrates a perspective view of one end of one of a pair of axle adapters partially within and through one through hole of a mounting portion of one of a pair of L-shaped mounts and the other end of one of a pair of axle adapters partially within an opening of a first conversion shaft sleeve, according to disclosed embodiments.
Figure 8:
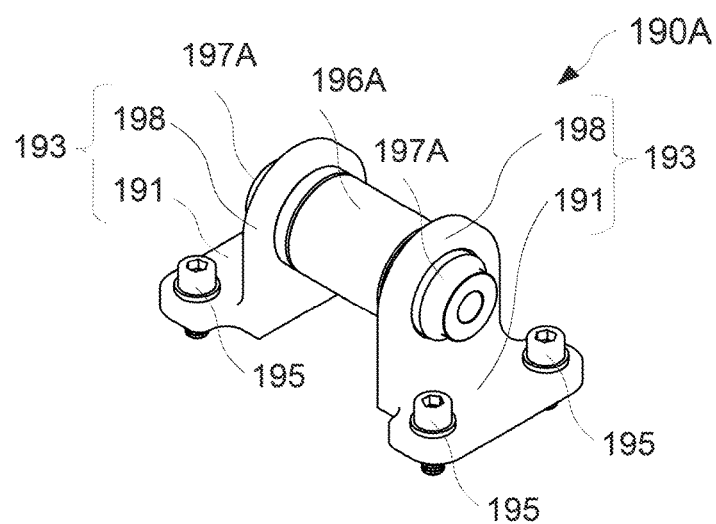
FIG. 8 illustrates a perspective view of a first pair of axle adapters and a first conversion shaft sleeve assembled to a pair of L-shaped mounts, according to disclosed embodiments.
Figure 9:
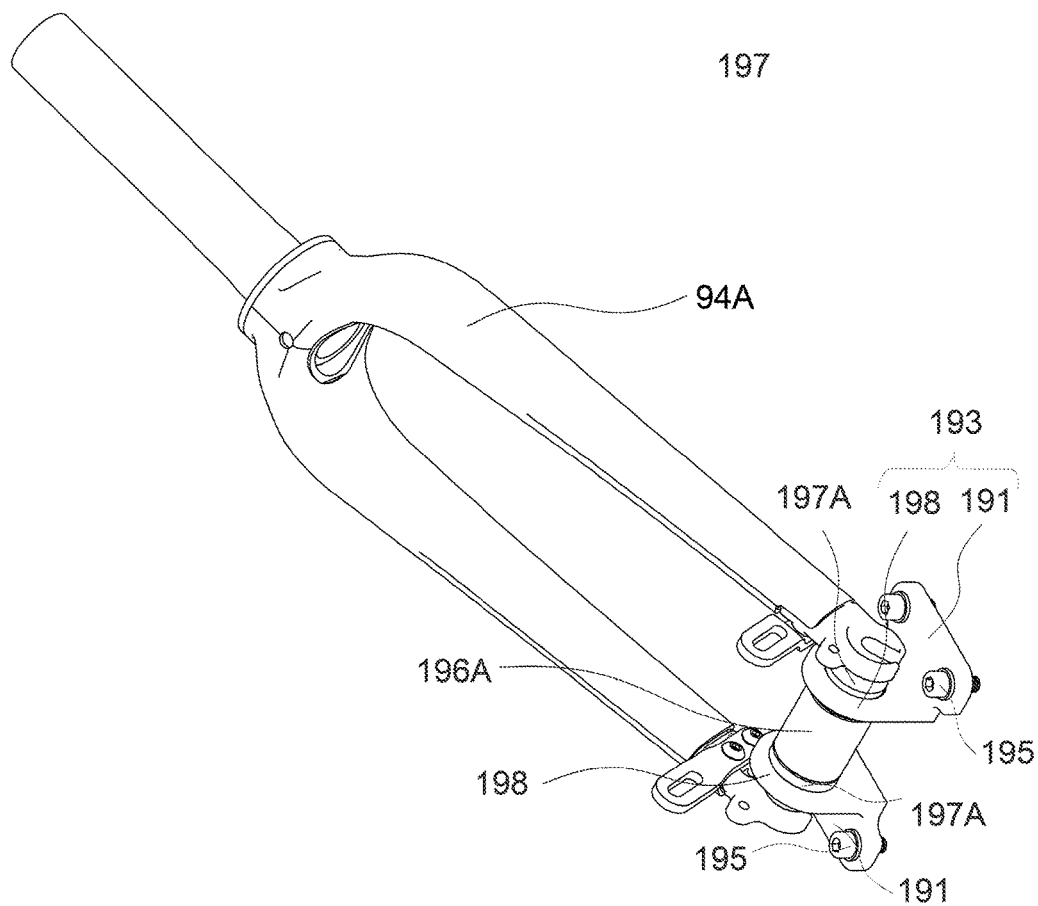
FIG. 9 illustrates a perspective view of a first pair of axle adapters and a first conversion shaft sleeve assembled to a pair of L-shaped mounts, mounted by a first front fork, according to disclosed embodiments.
Figure 10:
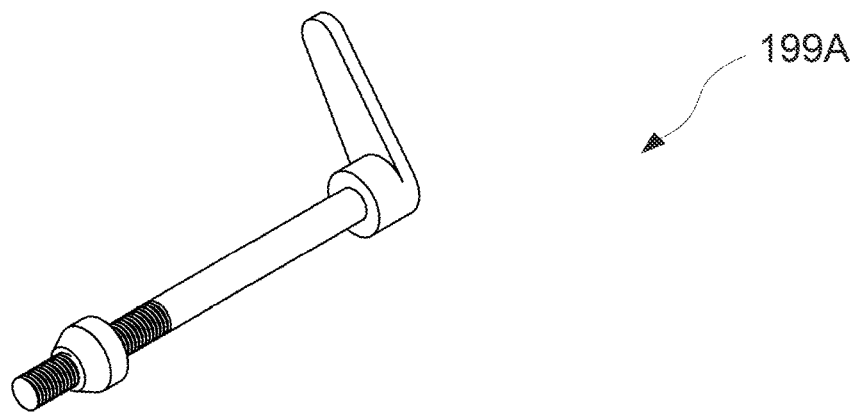
FIG. 10 illustrates a perspective view of a first thru-axle quick release front fork clamp of at least one vehicle receiving assembly, according to disclosed embodiments.
Figure 11:
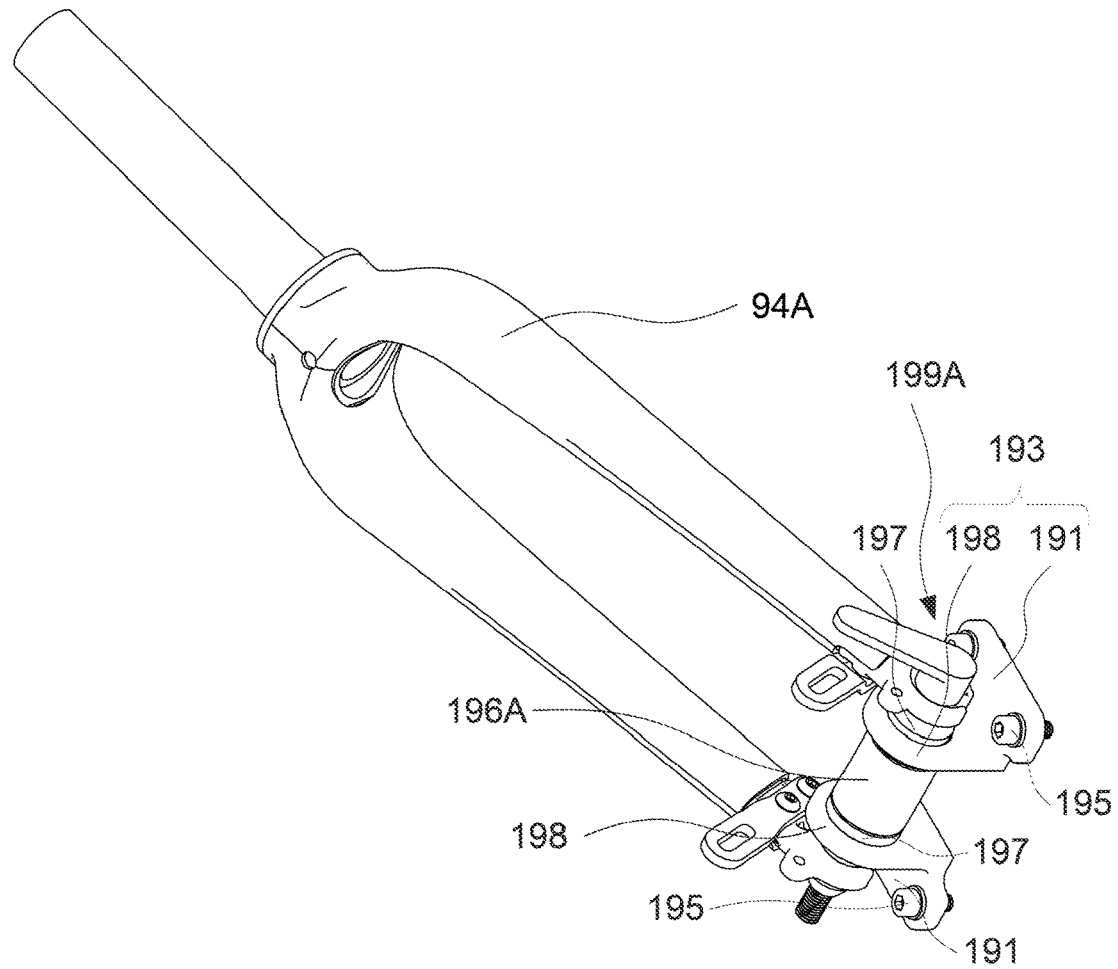
FIG. 11 illustrates a perspective view of at least one vehicle receiving assembly, clamping a first front fork thereto, according to disclosed embodiments.
Figure 12:
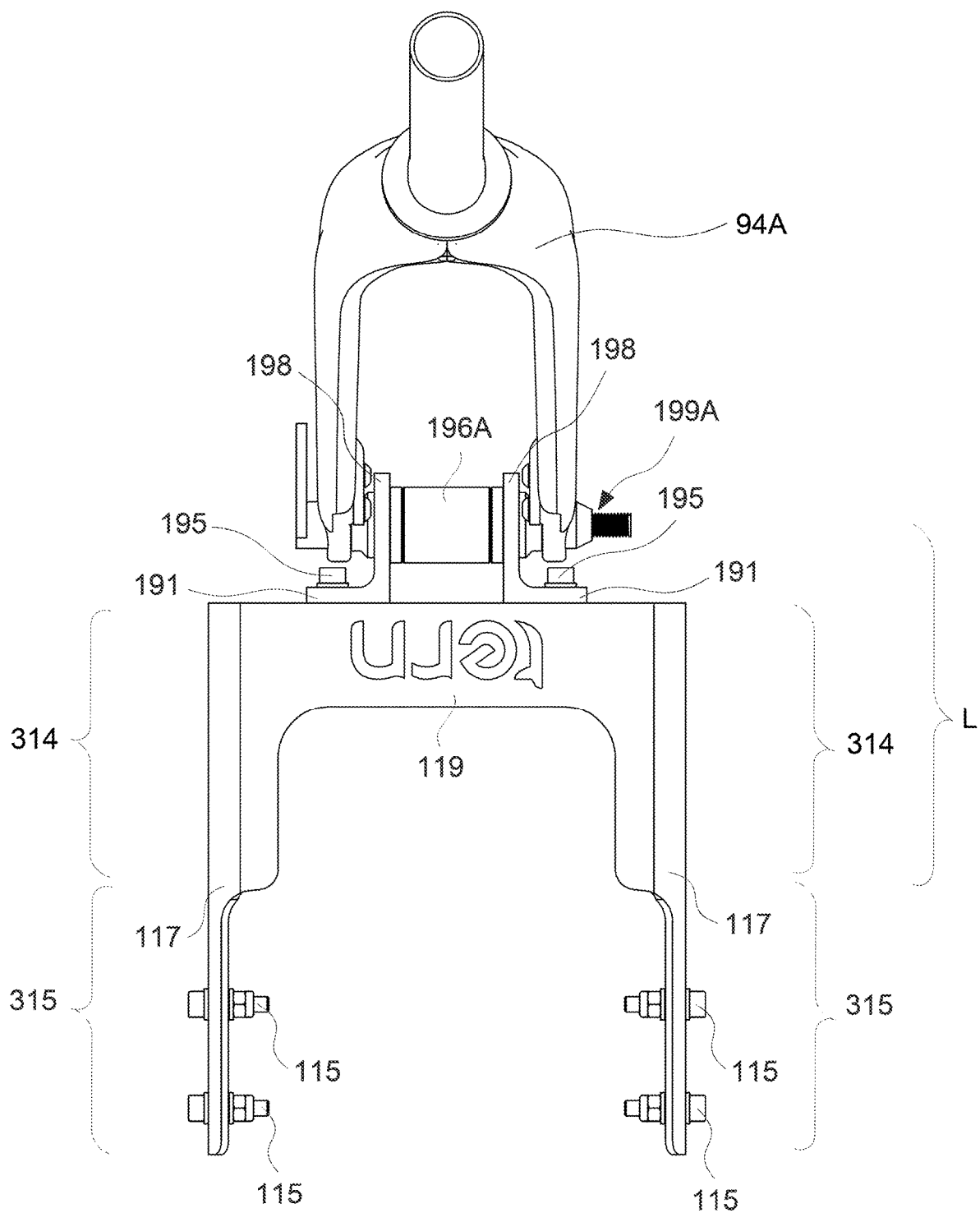
FIG. 12 illustrates another perspective view of a vehicle towing hitch securing a first front fork thereto, according to disclosed embodiments.

FIG. 4C illustrates yet another perspective view of the U-shaped bracket structure 110 of FIG. 4A, having a pair of L-shaped mounts 193/193 assembled thereto, according to disclosed embodiments. FIG. 4D illustrates yet another perspective view of the U-shaped bracket structure 110 of FIG. 4A, having a pair of L-shaped mounts 193/193 assembled thereto, according to disclosed embodiments. FIG. 5 illustrates a perspective view of a first conversion shaft sleeve 196A of at least one vehicle receiving assembly 190A of a vehicle towing hitch 100, according to disclosed embodiments. FIG. 6 illustrates a perspective view of a pair of axle adapters of at least one vehicle receiving assembly 190A of a vehicle towing hitch 100, according to disclosed embodiments. As illustrated in FIGS. 4C to 6, and FIGS. 2 to 4B, the support plate 116 includes at least a first set of four assembly holes 112A/112A/112A/112A and the at least one vehicle receiving assembly 190A includes a first conversion shaft sleeve 196A, a first pair of axle adapters 197A/197A, a pair of L-shaped mounts 193/193, and a first thru-axle quick release front fork clamp 199A. Each pair of L-shaped mounts 193/193 includes an assembly portion 191 having two fastening holes 192/192 separated by a distance and two corresponding fastening elements 195/195 and a mounting portion 198 including one through hole 194 extending perpendicularly from an edge of the assembly portion 191. A size of a core diameter of the first pair of axle adapters 197A/197A is the same as a size of a diameter of a thru-axle of the first thru-axle quick release front fork clamp 199A. FIG. 7 illustrates a perspective view of one end of one of the first pair of axle adapters 197A/197A partially within and through the one through hole 194 of the mounting portion 198 of one of the pair of L-shaped mounts 193/193 and the other end of one of the first pair of axle adapters 197A/197A partially within an opening of the first conversion shaft sleeve 196A, according to disclosed embodiments. FIG. 8 illustrates a perspective view of a first pair of axle adapters and a first conversion shaft sleeve 196A assembled to a pair of L-shaped mounts 193/193, according to disclosed embodiments. As shown in FIGS. 7 to 8, and FIGS. 2 to 3 and 5 to 6, one end of each of the first pair of axle adapters 197A/197A, correspond partially within opposing openings of the first conversion shaft sleeve 196A and the other end of each of the first pair of axle adapters 197A/197A, correspond partially within and through each of the one through hole 194 of the mounting portion 198 of the pair of L-shaped mounts 193/193. FIG. 9 illustrates a perspective view of a first pair of axle adapters 197A/197A and a first conversion shaft sleeve 196A assembled to a pair of L-shaped mounts 193/193, mounted by a first front fork 94A, according to disclosed embodiments. FIG. 10 illustrates a perspective view of a first thru-axle quick release front fork clamp of at least one vehicle receiving assembly 190A, according to disclosed embodiments. FIG. 11 illustrates a perspective view of at least one vehicle receiving assembly 190A, clamping a first front fork 94A thereto, according to disclosed embodiments. FIG. 12 illustrates another perspective view of a vehicle towing hitch 100 securing a first front fork 94A thereto, according to disclosed embodiments. As illustrated in FIGS. 9 to 12, the two corresponding fastening elements 195/195 of each of the pair of L-shaped mounts 193/193 assemble the pair of L-shaped mounts 193/193, the first pair of axle adapters 197A/197A, and the first conversion shaft sleeve 196A to the support plate 116 through two of the at least a first set of four assembly holes 112A/112/112/112A, respectively. The first thru-axle quick release front fork clamp 199A is assembled and disengaged through each of the one through hole 194 of the mounting portion 198 of the pair of L-shaped mounts 193/193, the first pair of axle adapters 197A/197A, and the first conversion shaft sleeve 196A. In the illustrated embodiments, the first thru-axle quick release front fork clamp 199A is configured to clamp the first front fork 94A to the at least one vehicle receiving assembly 190A; however, the embodiments are not limited thereto. A thru axle front fork clamp of the at least one vehicle 90 may also clamp the first front fork 94A to the at least one vehicle receiving assembly 190A. As an example, a thru axle front fork clamp of a towed road bike, triathlon bike, mountain bike, hybrid bike, cargo bike, electric bike, BMX bike, or kids bike, or the like may also be used as the first thru-axle quick release front fork clamp 199A for assembly and disengagement through each of the one through hole 194 of the mounting portion 198 of the pair of L-shaped mounts 193/193, the first pair of axle adapters 197A/197A, and the first conversion shaft sleeve 196A and clamping of the first front fork 94A of the towed road bike, triathlon bike, mountain bike, hybrid bike, cargo bike, electric bike, BMX bike, or kids bike, or the like to the at least one vehicle receiving assembly 190A.

Figure 13:
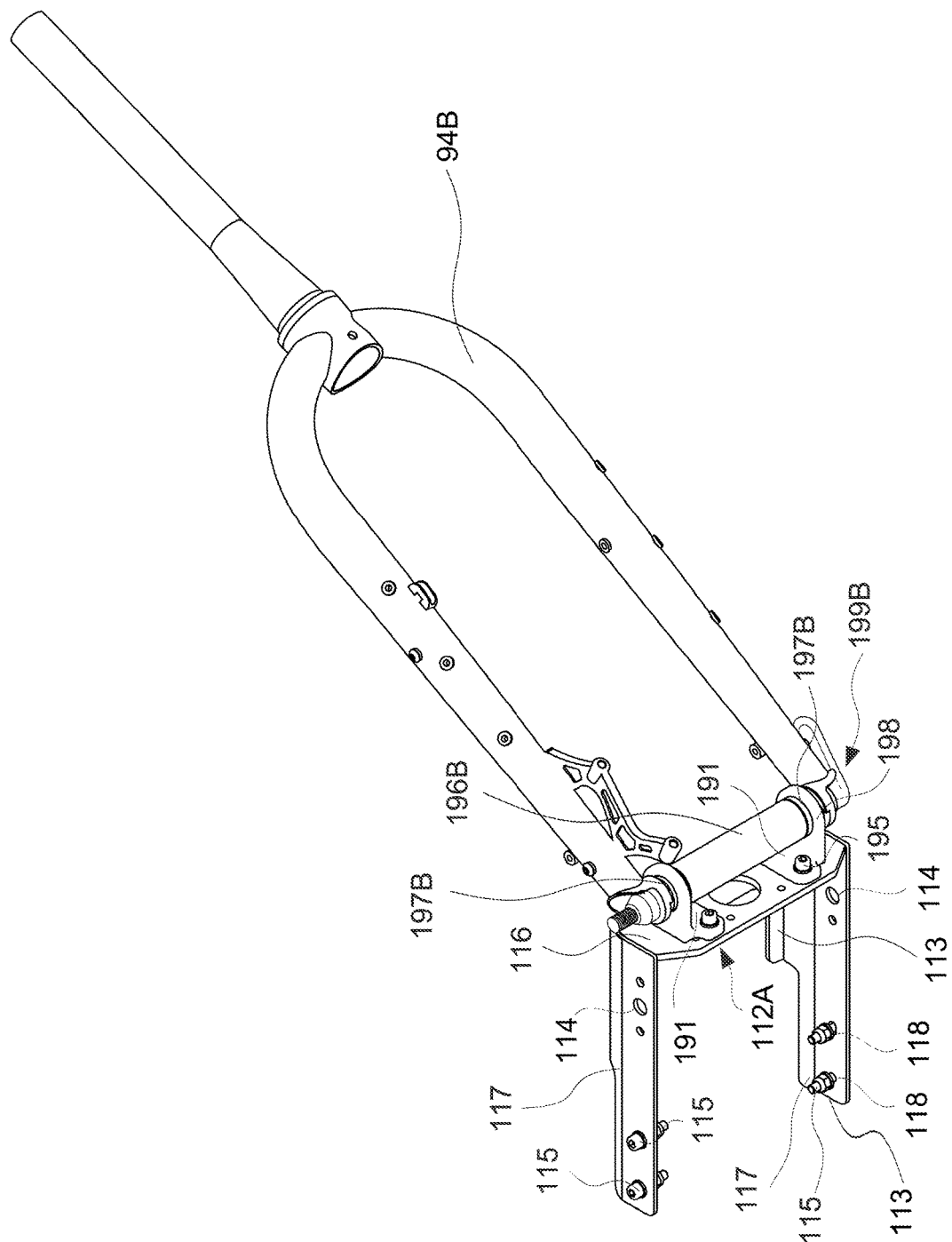
FIG. 13 illustrates a perspective view of another vehicle towing hitch securing a second front fork thereto, according to disclosed embodiments.
Figure 14:
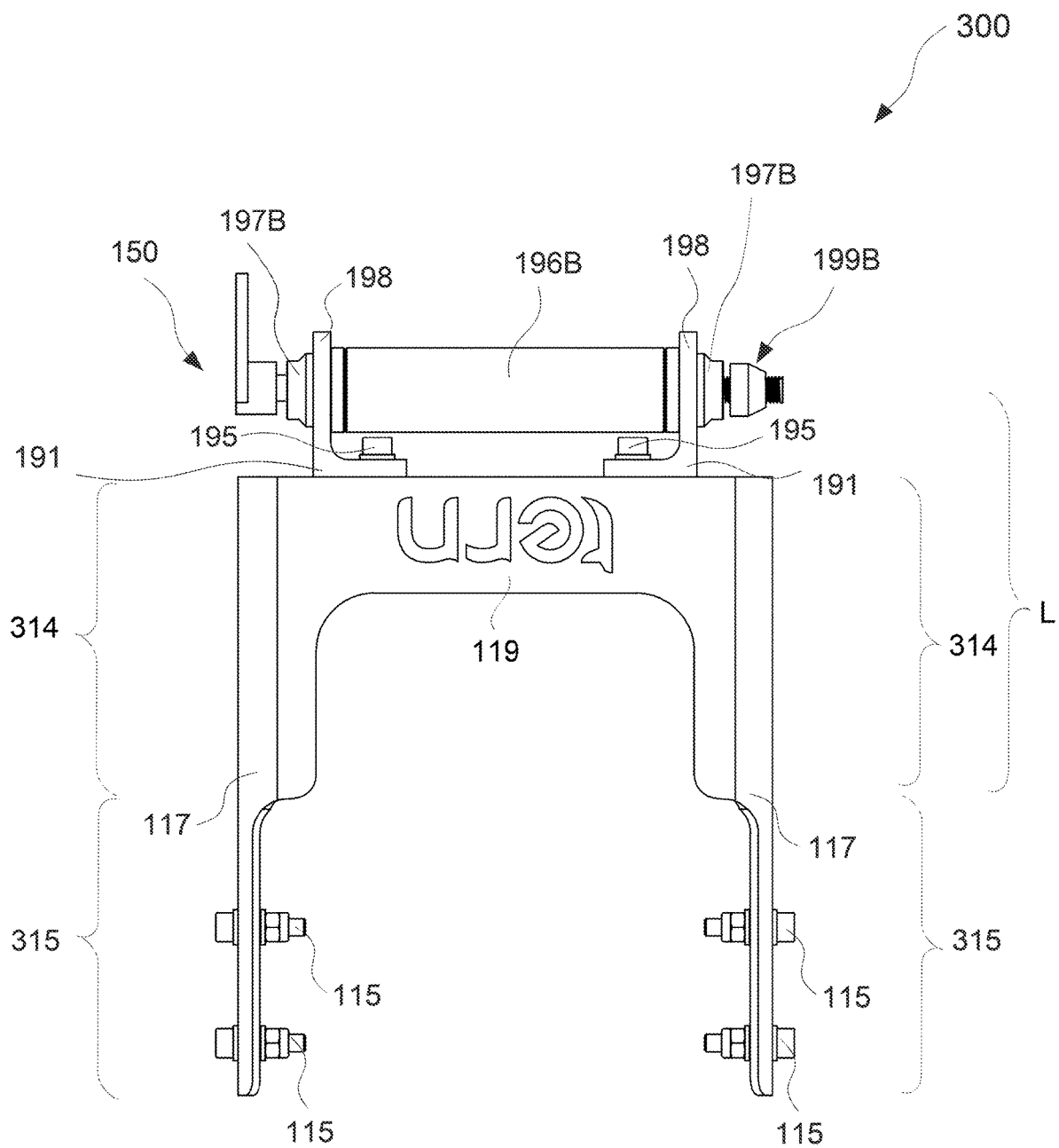
FIG. 14 illustrates a perspective view of another vehicle towing hitch, according to disclosed embodiments.
Figure 15A:
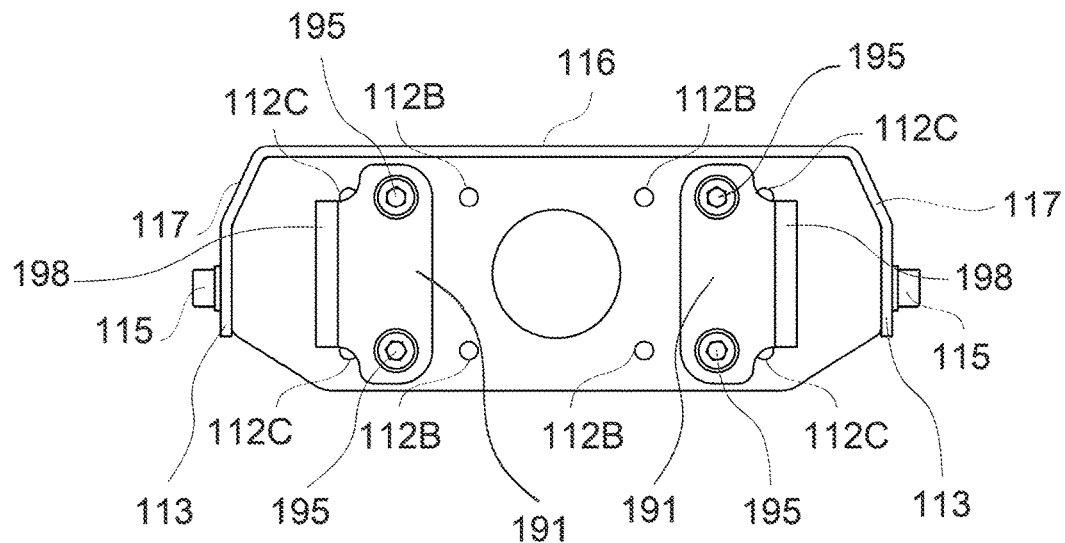
FIG. 15A illustrates a perspective view of a U-shaped bracket structure of a vehicle towing hitch, having a pair of L-shaped mounts assembled thereto, according to disclosed embodiments.
Figure 15B:
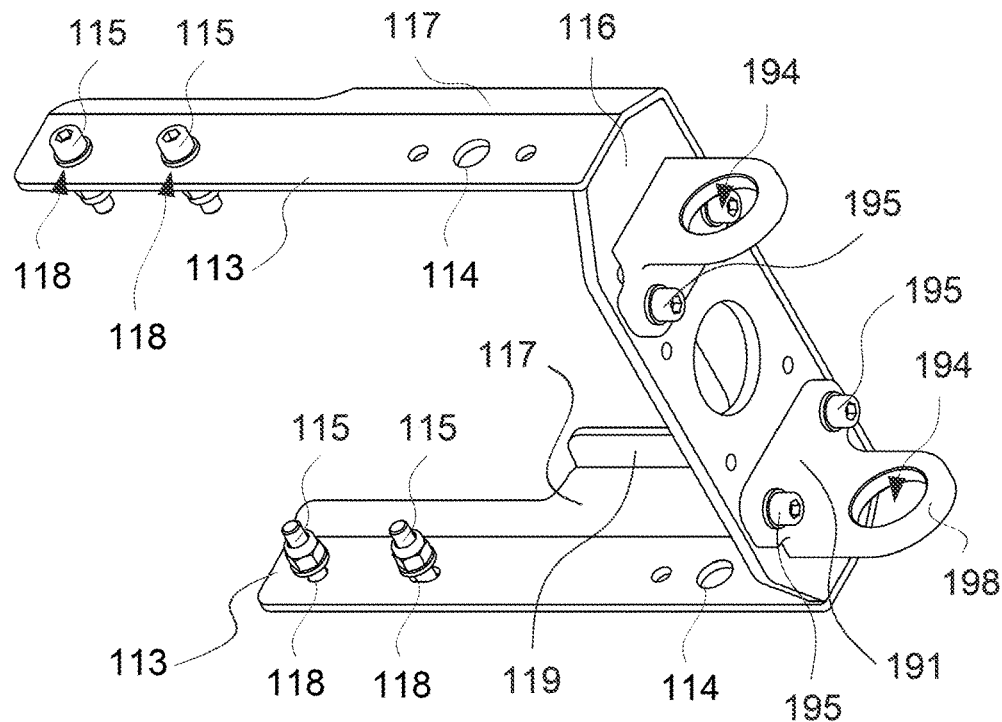
FIG. 15B illustrates another perspective view of the U-shaped bracket structure of FIG. 15A, having a pair of L-shaped mounts assembled thereto, according to disclosed embodiments.
Figure 15C:
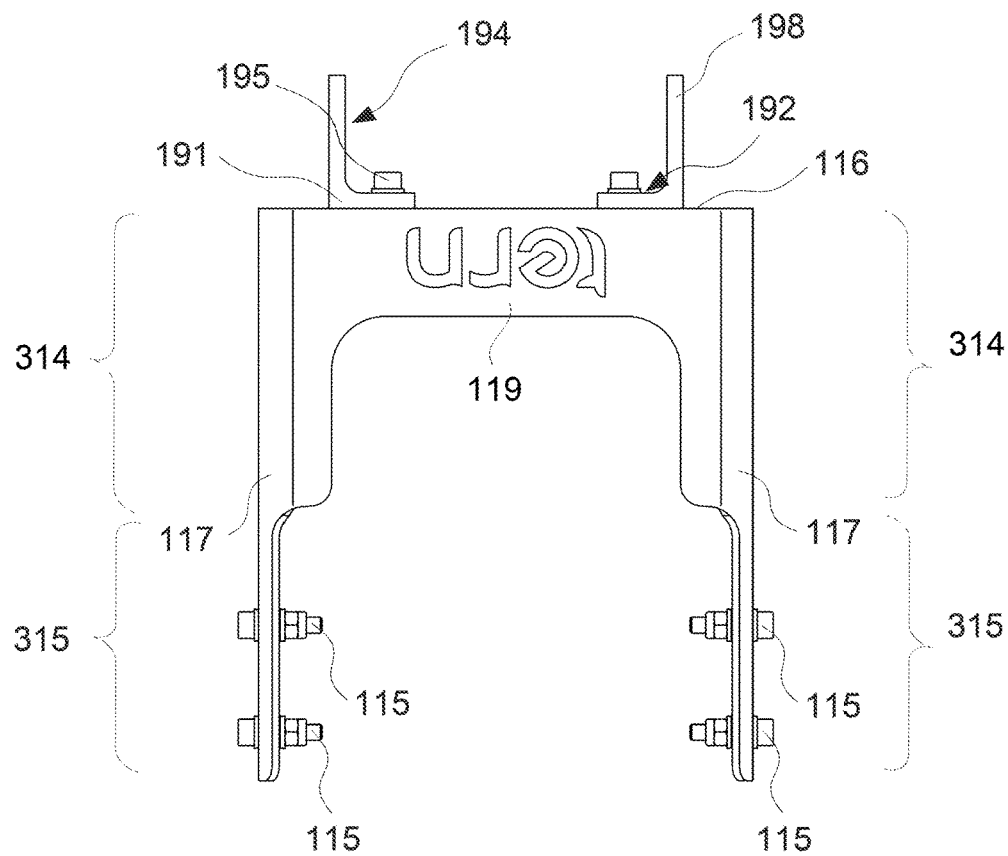
FIG. 15C illustrates yet another perspective view of the U-shaped bracket structure of FIG. 15A, having a pair of L-shaped mounts assembled thereto, according to disclosed embodiments.
Figure 16:
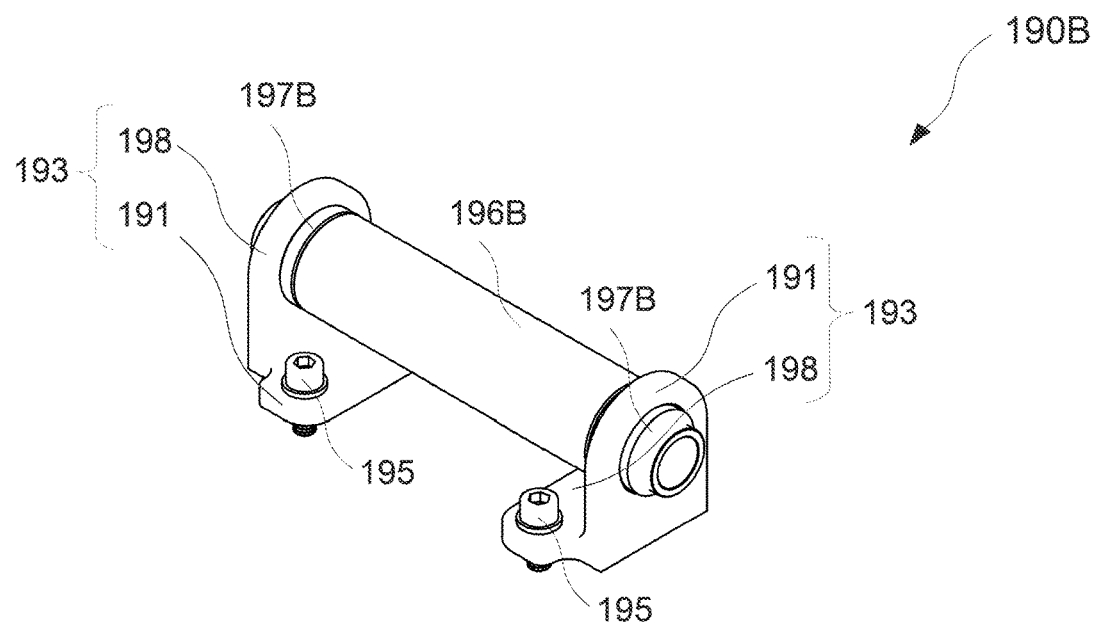
FIG. 16 illustrates a perspective view of a second pair of axle adapters and a second conversion shaft sleeve assembled to a pair of L-shaped mounts, according to disclosed embodiments.
Figure 17:
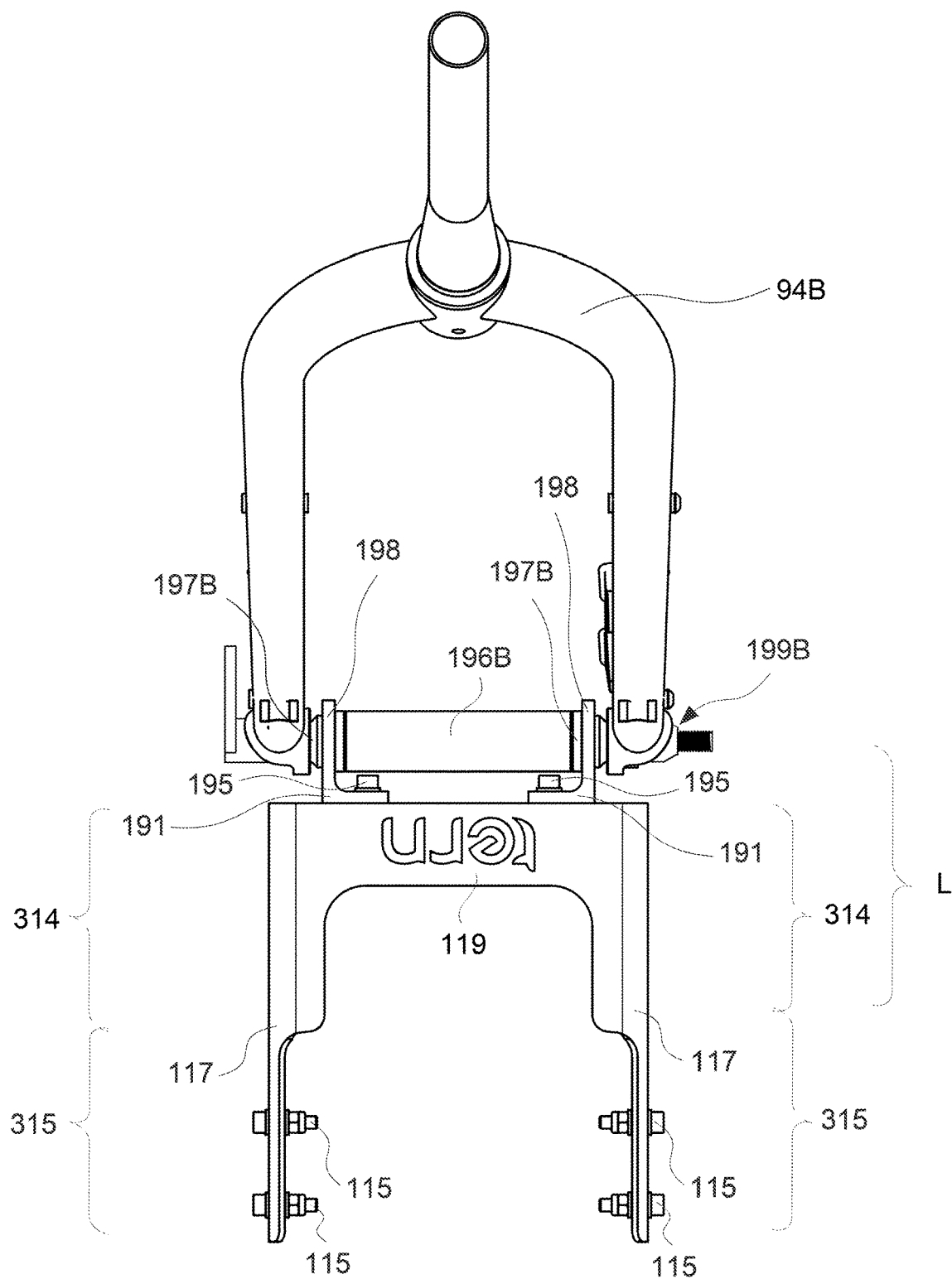
FIG. 17 illustrates another perspective view of a vehicle towing hitch, securing a second front fork thereto, according to disclosed embodiments.

In the illustrated embodiments, the support plate 116 includes a first set of four assembly holes 112A/112A/112A/112A, the at least one vehicle receiving assembly 190A includes a first conversion shaft sleeve 196A, a first pair of axle adapters 197A/197A, and a first thru-axle quick release front fork clamp 199A, and the one portion 94A of the at least one vehicle 90 is a first front fork 94A; however, the embodiments are not limited thereto. FIG. 13 illustrates a perspective view of another vehicle towing hitch 300 securing a second front fork 94B thereto, according to disclosed embodiments. FIG. 14 illustrates a perspective view of another vehicle towing hitch 300, according to disclosed embodiments. FIG. 15A illustrates a perspective view of a U-shaped bracket structure 110 of a vehicle towing hitch 300, having a pair of L-shaped mounts 193/193 assembled thereto, according to disclosed embodiments. FIG. 15B illustrates another perspective view of the U-shaped bracket structure 110 of FIG. 15A, having a pair of L-shaped mounts 193/193 assembled thereto, according to disclosed embodiments. FIG. 15C illustrates yet another perspective view of the U-shaped bracket structure 110 of FIG. 15A, having a pair of L-shaped mounts 193/193 assembled thereto, according to disclosed embodiments. As illustrated in FIGS. 13 to 15C, the support plate 116 further includes a second set of four assembly holes 112B/112B/112B/112B, the at least one vehicle receiving assembly 190B further includes a second conversion shaft sleeve 196B, a second pair of axle adapters 197B/197B, and a second thru-axle quick release front fork clamp 199B, and the one portion 94B of the at least one vehicle is a second front fork 94B having a different axle length than the first front fork 94A. The second set of four assembly holes 112B/112B/112B/112B are disposed between the first set of four assembly holes 112A/112A/112A/112A or disposed on outer sides of the first set of four assembly holes 112C/112C/112C/112C. FIG. 16 illustrates a perspective view of a second pair of axle adapters 197B/197B and a second conversion shaft sleeve 196B assembled to a pair of L-shaped mounts 193/193, according to disclosed embodiments. FIG. 17 illustrates another perspective view of a vehicle towing hitch 300, securing a second front fork 94B thereto, according to disclosed embodiments. As illustrated in FIGS. 16 to 17 and 14 and FIGS. 2, 3, 9 and 11, a length of the second conversion shaft sleeve 196B is different from a length of the first conversion shaft sleeve 196A, and a size of a core diameter of the second pair of axle adapters 197B/197B and a size of a diameter of a thru-axle of the second thru-axle quick release front fork clamp 199B is different from the size of the core diameter of the first pair of axle adapters 197/197A and the size of the diameter of the thru-axle of the first thru-axle quick release front fork clamp 199A. The second conversion shaft sleeve 196B, the second pair of axle adapters 1976/197B, and the second thru-axle quick release front fork clamp 199B, is interchangeable with the first conversion shaft sleeve 196A, the first pair of axle adapters 197A/197A, and the first thru-axle quick release front fork clamp 199A. The two corresponding fastening elements 195/195 of each of the pair of L-shaped mounts 193/193 assemble the pair of L-shaped mounts 193/193, the second conversion shaft sleeve 196B and, the second pair of axle adapters 1976/197B and the second thru-axle quick release front fork clamp 199B or the first pair of axle adapters 197A/197A and the first thru-axle quick release front fork clamp 199A, to the support plate 116 through two of the at least a second set of four assembly holes 112B/112B/112B/112B, respectively, when a length of the second conversion shaft sleeve 196B is shorter than a length of the first conversion shaft sleeve 196A or through two of the at least a second set of four assembly holes 112C/112C/112C/112C, respectively, when a length of the second conversion shaft sleeve 196B is longer than a length of the first conversion shaft sleeve 196A. The second thru-axle quick release front fork clamp 199B or the first thru-axle quick release front fork clamp 199A is assembled and disengaged through each of the one through hole 194 of the mounting portion 198 of the pair of L-shaped mounts 193/193, the second conversion shaft sleeve 196B, and the second pair of axle adapters 1976/197B and the second thru-axle quick release front fork clamp 199B or the first pair of axle adapters 197A/197A and the first thru-axle quick release front fork clamp 199A. The second thru-axle quick release front fork clamp 199B and the first thru-axle quick release front fork clamp 199A is configured to clamp a second front fork 94B to the at least one vehicle receiving assembly 190B.

As illustrated in FIGS. 13 to 17, the assembly portion 191 of at least one of the pair of L-shaped mounts 193/193 is assembled to the support plate 116 facing a center of the support plate 116 or, as illustrated in FIGS. 2 to 4D, 9 to 7, and 11 to 12, the assembly portion 191 of at least one of the pair of L-shaped mounts 193/193 is assembled to the support plate 116 facing an edge of the support plate 116, or any combination of the foregoing.

In the illustrated embodiments, the support plate 116 includes three sets of four assembly holes 112A/112A/112A/112A, 112B/112B/112B/112B, 112C/112C/112C/112C; however, the embodiments are not limited thereto. The support plate 116 may include more or less than three sets of four assembly holes. In the illustrated embodiments, different diameters and widths or spacings of a front wheel thru-axle and front fork blades of a towed road bike, triathlon bike, mountain bike, hybrid bike, cargo bike, electric bike, BMX bike, or kids bike, or the like may be mounted to the at least one vehicle receiving assembly via the sets of four assembly holes, different direction of assembly of the assembly portion 191 of each of the pair of L-shaped mounts 193/193, variable sizes of the core diameter of the pair of axle adapters and diameter of a thru-axle of the thru-axle quick release front fork clamp, and variable lengths of a thru-axle of the thru-axle quick release front fork clamp and the conversion shaft sleeve. As an example, different diameter thru-axle sizes may include 9 mm, 12 mm, and 15 mm diameter thru-axles sizes; however, the embodiments are not limited thereto. Diameter sizes smaller than 9 mm or larger than 15 mm may also be implemented. As an example, different widths or spacings of front fork blades may include 74 mm, 100 mm, 110 mm, 120 mm, and 150 mm width sizes; however, the embodiments are not limited thereto. Width sizes smaller than 74 mm, for example, 70 mm and widths sizes larger than 150 mm, for example 160 mm may also be implemented. Moreover, in the illustrated embodiments, small incremental differences in widths of the front fork, as an example, 10 mm or less, may be available via the variable direction of assembly of the assembly portion 191 of each of the pair of L-shaped mounts 193/193 facing a center of the support plate 116 or facing an edge of the support plate 116. Without the variable direction of assembly of the assembly portion 191, small incremental differences in widths of the front fork would not be available as the sets of four assembly holes may be too close together or overlap due to the diameter of the fastener. Furthermore, in the illustrated embodiments, the direction of assembly of the assembly portion 191 avoids contact of a portion of the first front fork 94A, second front fork 94B, or other front forks, as an example, a front disc brake mount etc., with any of the two corresponding fastening elements 195/195 of each of the pair of L-shaped mounts 193/193 when the first front fork 94A, second front fork 94B, or other front forks, respectfully, rotate when traveling up and down inclines.

Figure 18A:
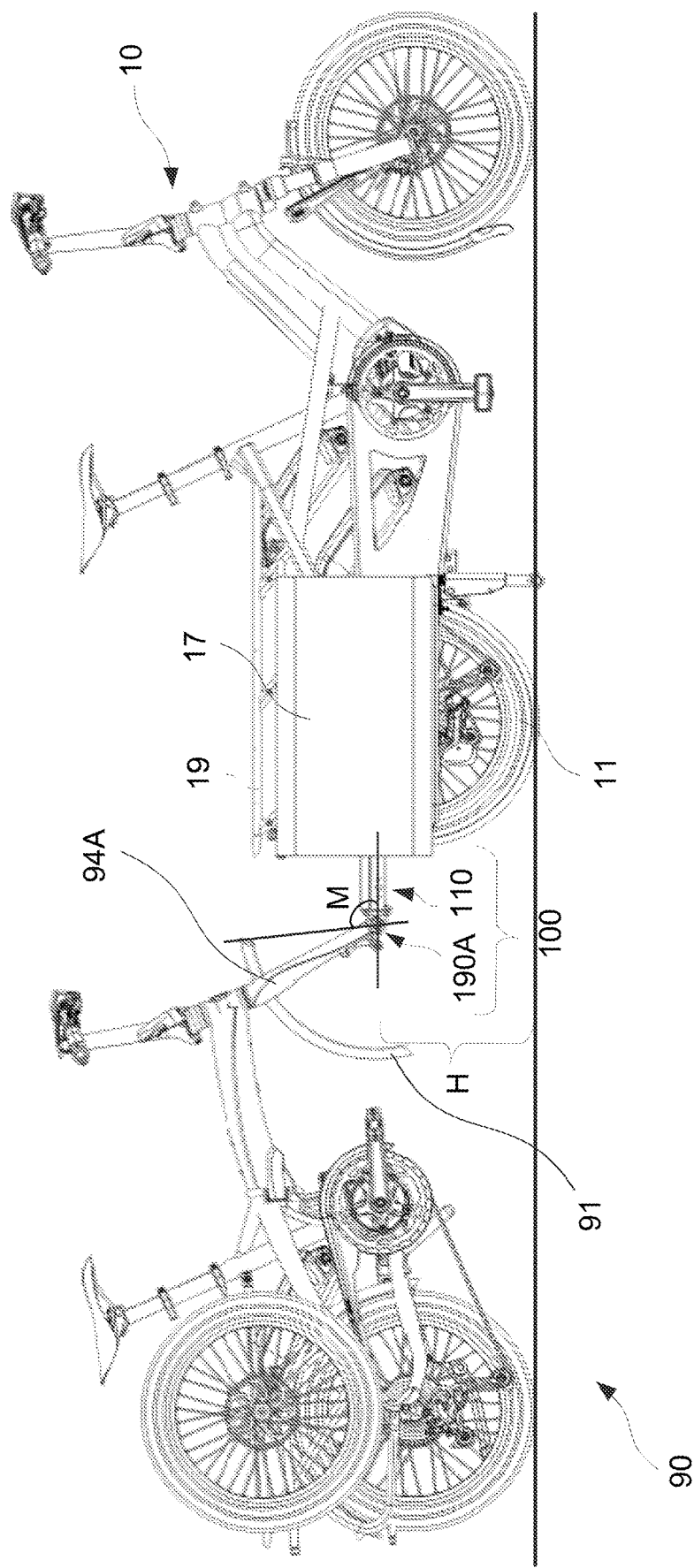
FIG. 18A illustrates a perspective view of a vehicle towing hitch, towing a vehicle on a flat surface while assembled to a bicycle, according to disclosed embodiments.
Figure 18B:
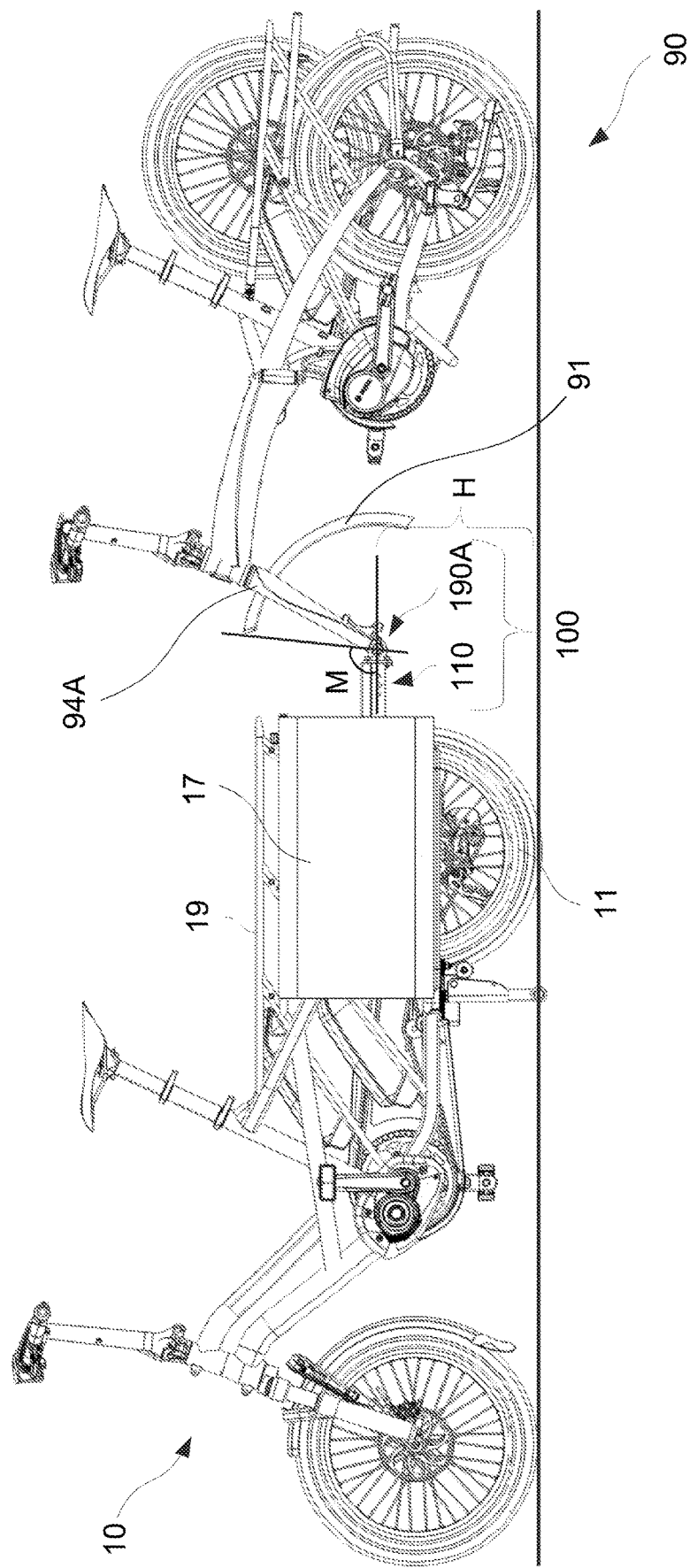
FIG. 18B illustrates another perspective view of the vehicle towing hitch of FIG. 18A, towing a vehicle on a flat surface while assembled to a bicycle, according to disclosed embodiments.
Figure 18C:
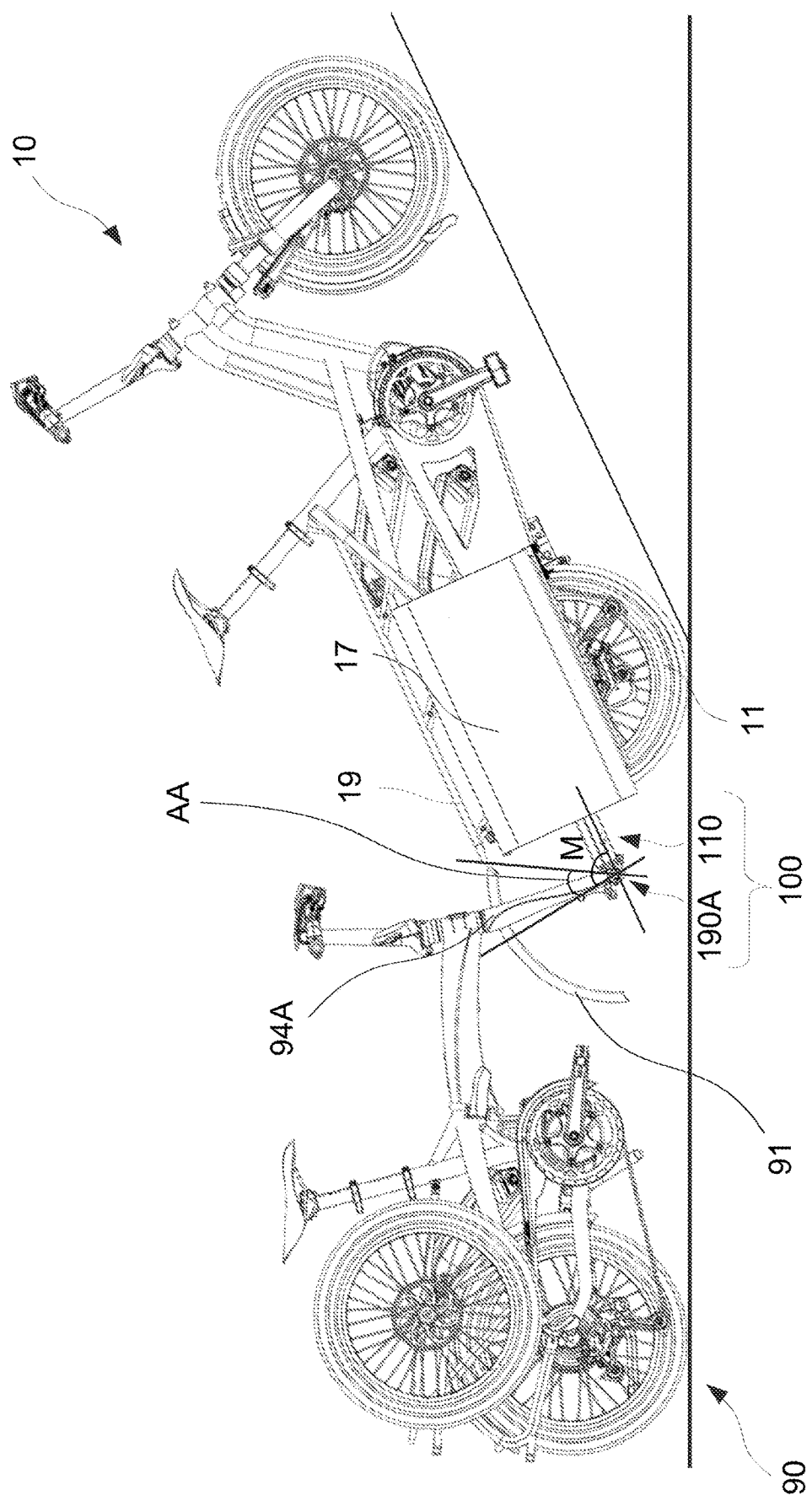
FIG. 18C illustrates yet another perspective view of the vehicle towing hitch of FIG. 18A, towing a vehicle up an inclined surface while assembled to a bicycle, according to disclosed embodiments.
Figure 18D:
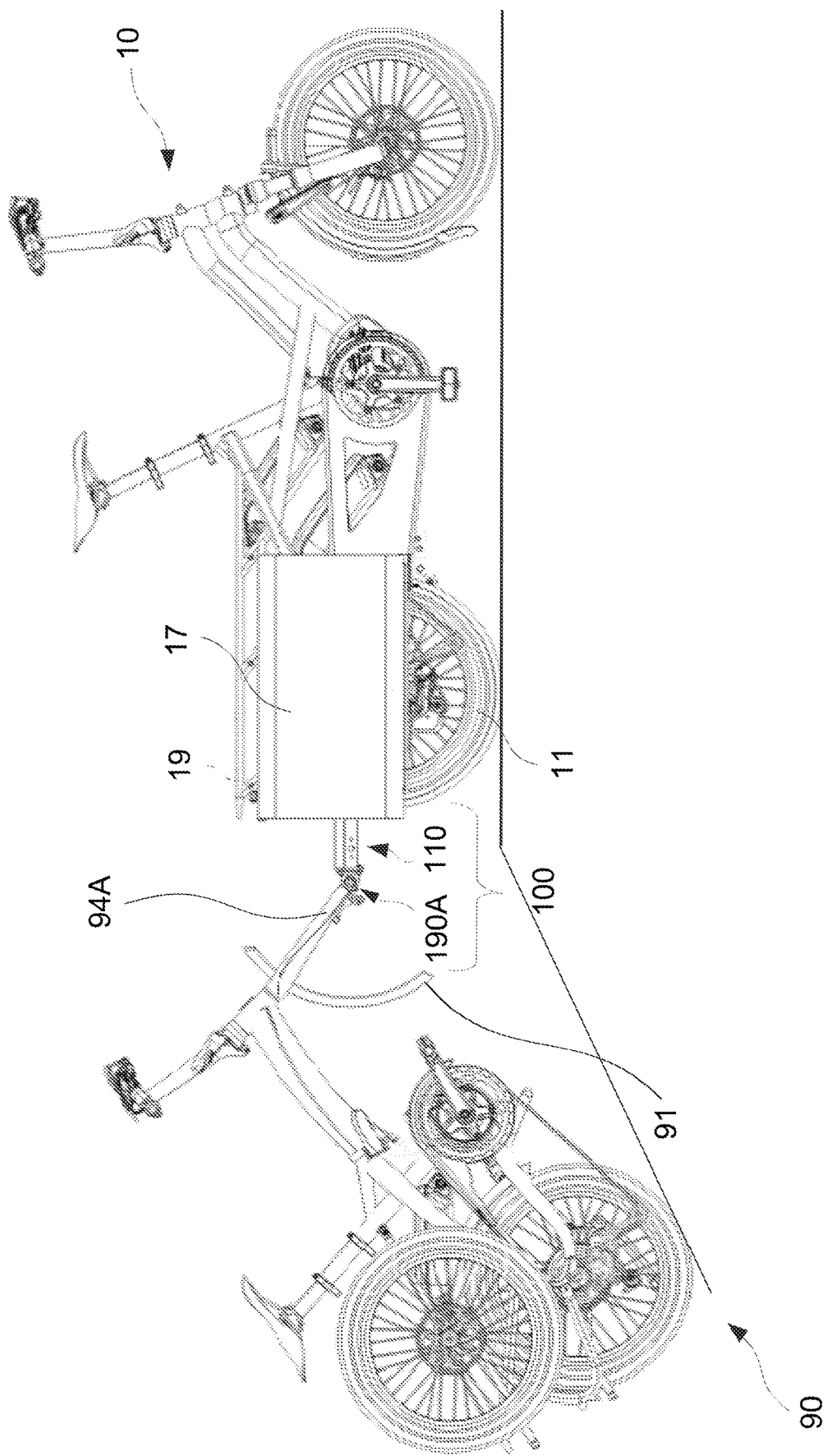
FIG. 18D illustrates yet another perspective view of the vehicle towing hitch of FIG. 18A, towing a vehicle to a flat surface while assembled to a bicycle, according to disclosed embodiments.
Figure 18E:
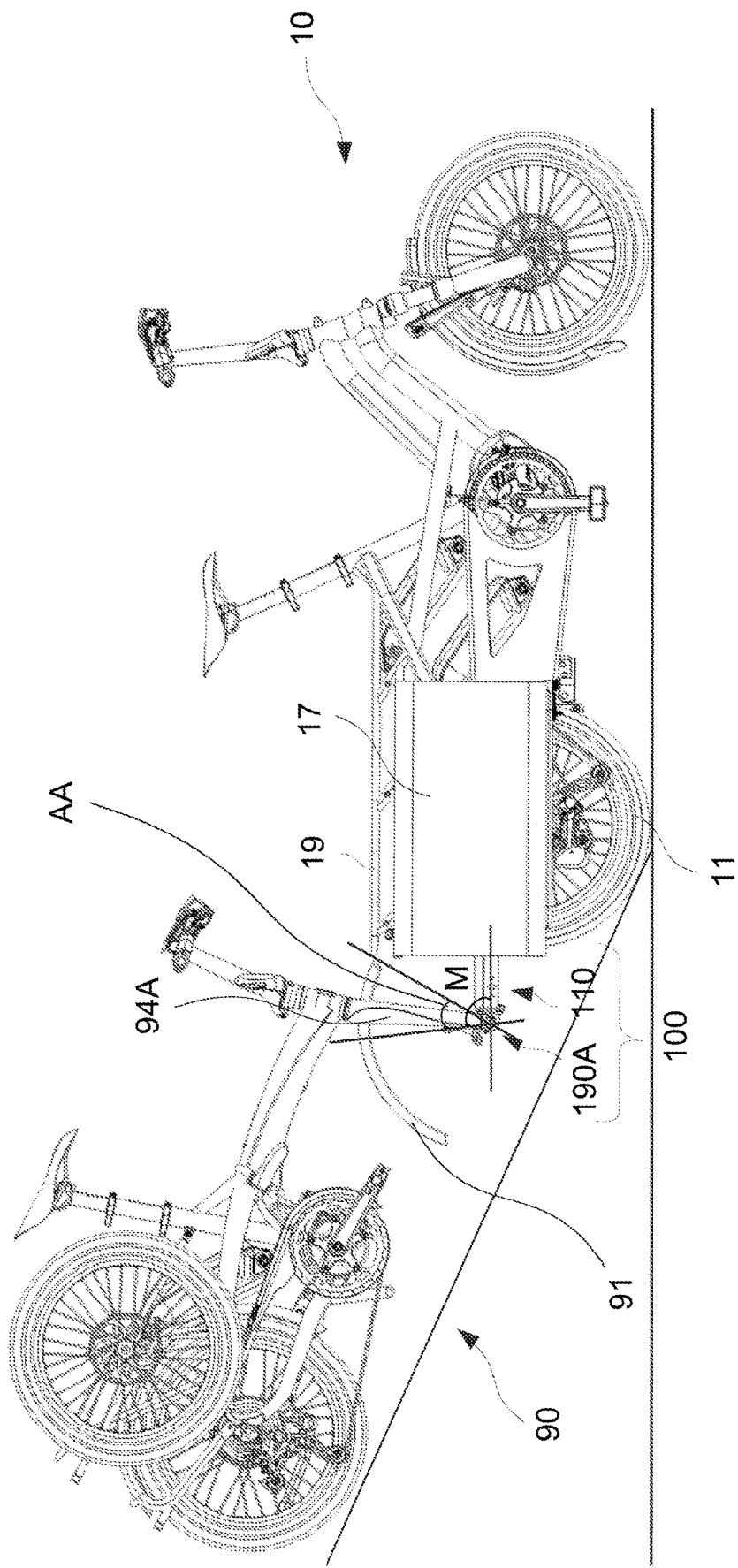
FIG. 18E illustrates yet another perspective view of the vehicle towing hitch of FIG. 18A, towing a vehicle down an inclined surface while assembled to a bicycle, according to disclosed embodiments.

FIG. 18A illustrates a perspective view of a vehicle towing hitch 100, towing a vehicle 90 on a flat surface while assembled to a bicycle 10, according to disclosed embodiments. FIG. 18B illustrates another perspective view of the vehicle towing hitch 100 of FIG. 18A, towing a vehicle 90 on a flat surface while assembled to a bicycle 10, according to disclosed embodiments. FIG. 18C illustrates yet another perspective view of the vehicle towing hitch 100 of FIG. 18A, towing a vehicle 90 up an inclined surface while assembled to a bicycle 10, according to disclosed embodiments. FIG. 18D illustrates yet another perspective view of the vehicle towing hitch 100 of FIG. 18A, towing a vehicle 90 to a flat surface while assembled to a bicycle 10, according to disclosed embodiments. FIG. 18E illustrates yet another perspective view of the vehicle towing hitch 100 of FIG. 18A, towing a vehicle 90 down an inclined surface while assembled to a bicycle 10, according to disclosed embodiments. As illustrated in FIGS. 18A to 18E, and FIGS. 3, 12 14, and 17, the bicycle 10 further includes a longtail 19 above a rear wheel 11. A height H of the vehicle towing hitch 100, fixed to the frame portion 14, and a length L of each of the supporting portion 314/314 and the support plate 116, extending in a direction laterally beyond the length of the bicycle 10, and the at least one vehicle receiving assembly 190A, extending in a direction laterally beyond the length of each of the supporting portion 314/314 and the support plate 116, is configured such that when a diameter of a rear wheel 11 of the at least one vehicle 90 is the same as or smaller than the rear wheel 11 of the bicycle 10 and both are traveling up and down inclines, a first front fender 91 of the first front fork 94A or a second front fender of the second front fork 94B has at least a 35 degree rotational allowance angle AA before contacting the longtail 19 of the bicycle 10. In the illustrated embodiments, a mounted angle M of a first front fender of the first front fork or second front fender of the second front fork of the at least one vehicle from an end of the first front fork or the second front fork to a center of the vehicle towing hitch 100 parallel to the ground, is at least 95 degrees. In the illustrated embodiments, the height H of the vehicle towing hitch 100, fixed to the frame portion 14 of the bicycle 10 is between ½ and ¾ a diameter of a rear rim of the rear wheel 11 of the bicycle 10. If the height H of the vehicle towing hitch 100, fixed to the frame portion 14 of the bicycle 10 is lower than ½ a diameter of a rear rim of the rear wheel 11 of the bicycle 10, the mounted angle M of the front fork of the at least one vehicle 90 from an end of the front fork to a center of the vehicle towing hitch 100 parallel to the ground, would be less than 95 degrees and when a diameter of a rear wheel 11 of the at least one vehicle 90 is the same as or smaller than the rear wheel 11 of the bicycle 10 and both are traveling up and down inclines, a first front fender 91 of the first front fork 94A or a second front fender of the second front fork 94B would be less than the 35 degree rotational allowance angle AA before contacting the longtail 19 of the bicycle 10. Moreover, if the height H of the vehicle towing hitch 100, fixed to the frame portion 14 of the bicycle 10 is lower than ½ a diameter of a rear rim of the rear wheel 11 of the bicycle 10, a downward force placed on the at least one vehicle receiving assembly 190A of the vehicle towing hitch 100 would increase, making it easier for wheelies of the bicycle 10 to occur, increasing accident risks for a bicyclist or damage risks to the bicycle 10 and the towed at least one vehicle 90. If the height H of the vehicle towing hitch 100, fixed to the frame portion 14 of the bicycle 10 is greater than ¾ a diameter of a rear rim of the rear wheel 11 of the bicycle 10, the mounted angle M of the front fork of the at least one vehicle 90 from an end of the first front fork 94A to a center of the vehicle towing hitch 100 parallel to the ground, would be greater than 95 degrees, making it easier for the towed at least one vehicle 90 to flip to a side when the bicycle 10 is turning left and right, as the towed at least one vehicle 90 would be mounted more vertically. In the illustrated embodiments, a length of the fixing portion 315/315 of each of the pair of opposing parallel arm plates 113/113 is longer than ¾ a length of the supporting portion 314/314 of each of the pair of opposing parallel arm plates 113/113 and shorter than a length of the supporting portion 314/314 of each of the pair of opposing parallel arm plates 113/113. In the illustrated embodiments, a length L of each of the supporting portion 314/314 and the support plate 116, extending in a direction laterally beyond the length of the bicycle 10, is longer than ¼ a length of a rear rim of the rear wheel 11 of the bicycle 10 and shorter than ⅓ a length of a rear rim of the rear wheel 11 of the bicycle 10 such that a downward force placed on the at least one vehicle receiving assembly 190A of the vehicle towing hitch 100 would not be far from the frame portion 14 of the bicycle 10, which if further away, would make it easier for wheelies of the bicycle 10 to occur, increasing accident risks for a bicyclist or damage risks to the bicycle 10 and the towed at least one vehicle 90.

Figure 19A:
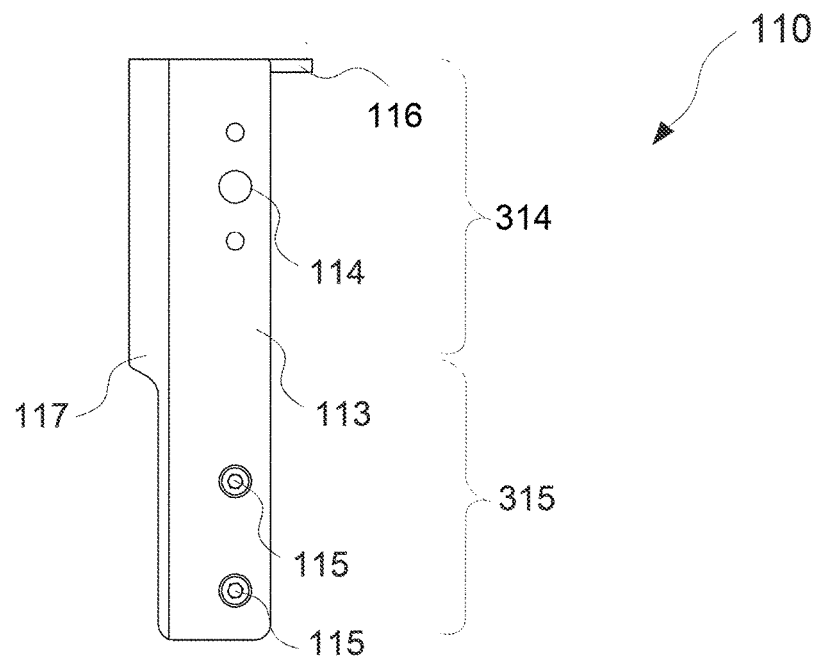
FIG. 19A illustrates a perspective view of a U-shaped bracket structure of a vehicle towing hitch, according to disclosed embodiments.
Figure 19B:
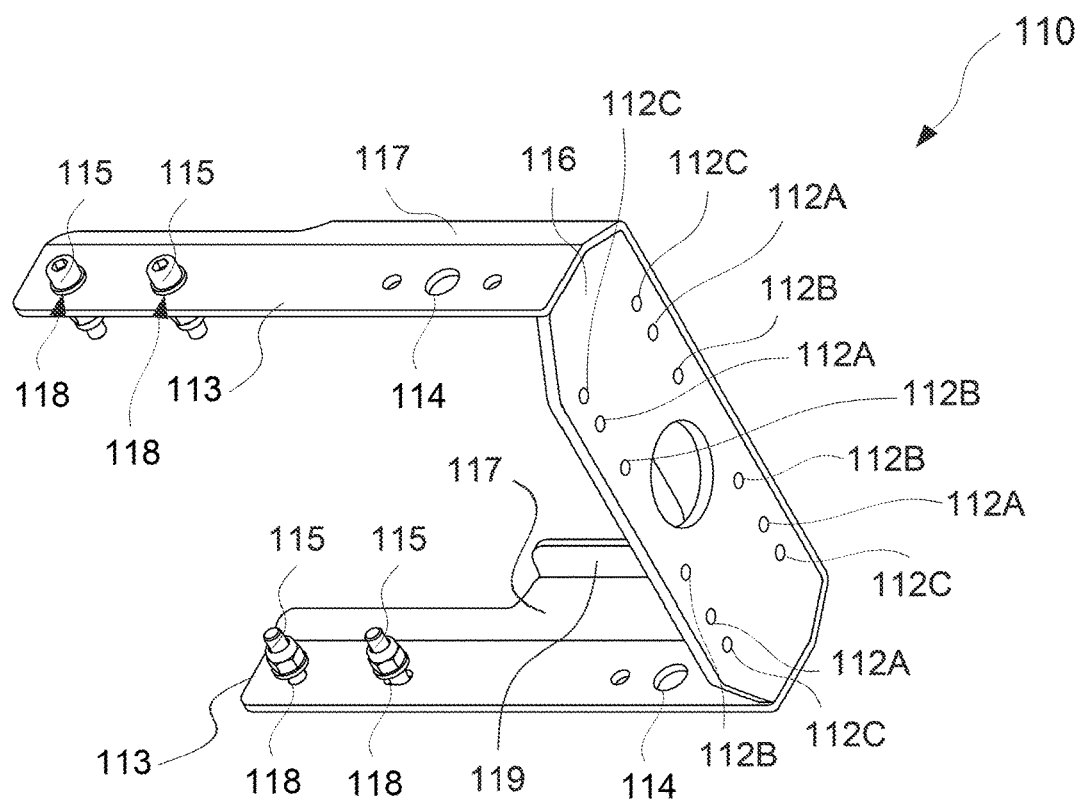
FIG. 19B illustrates another perspective view of the U-shaped bracket structure of a vehicle towing hitch of FIG. 19A, according to disclosed embodiments.
Figure 20:
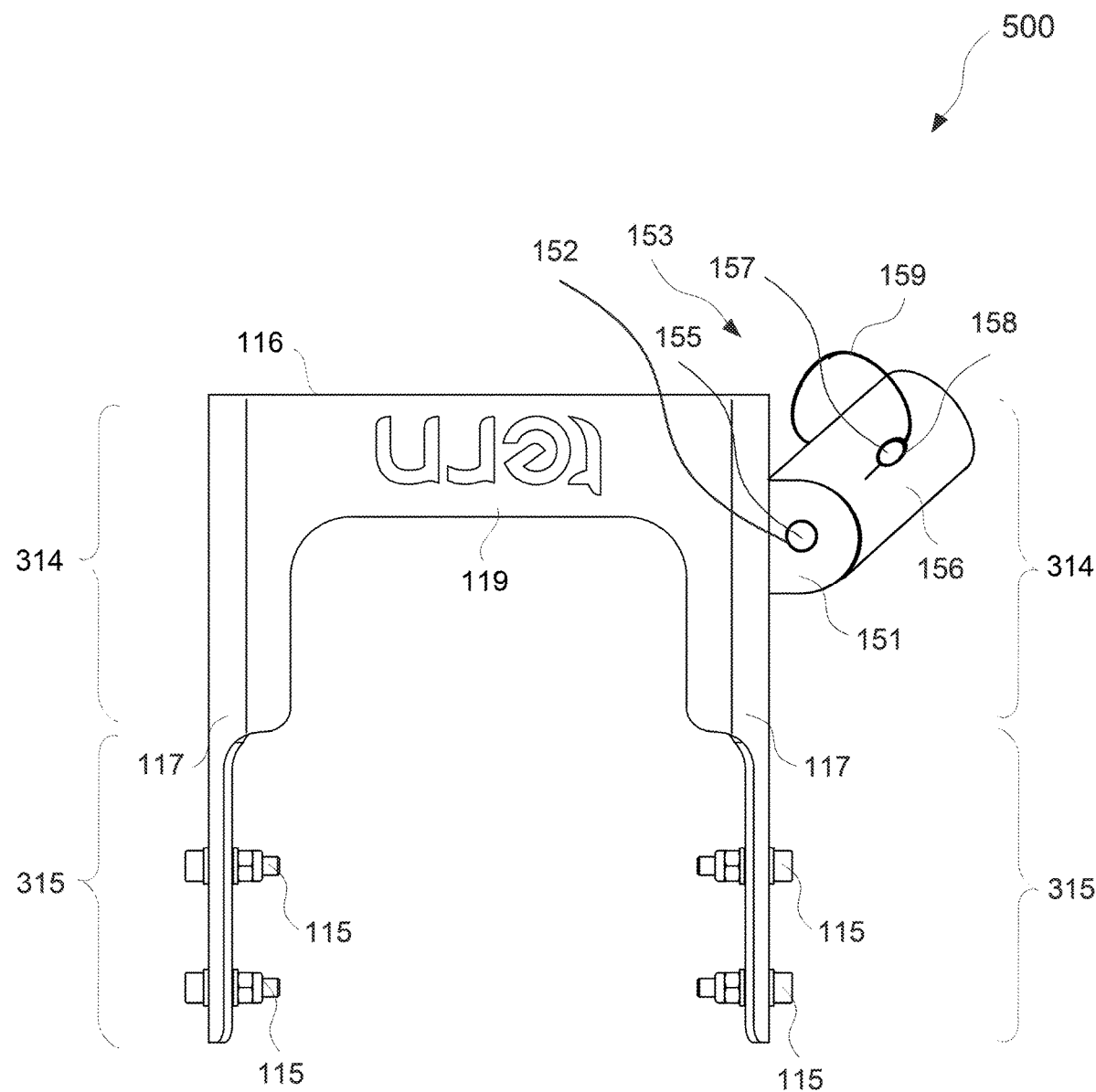
FIG. 20 illustrates a perspective view of a vehicle towing hitch, according to disclosed embodiments.

FIG. 19A illustrates a perspective view of a U-shaped bracket structure 110 of a vehicle towing hitch 500, according to disclosed embodiments. FIG. 19B illustrates another perspective view of the U-shaped bracket structure 110 of a vehicle towing hitch 500 of FIG. 19A, according to disclosed embodiments. FIG. illustrates a perspective view of a vehicle towing hitch 500, according to disclosed embodiments. As illustrated in FIGS. 19A to 20, each of the fixing portion 315/315 includes at least two fixing holes 118/118 separated by a distance and at least two corresponding fixing elements 115/115. At least one of the supporting portion 314/314 of the pair of opposing parallel arm plates 113/113 includes at least a side assembly hole 114 and the at least one vehicle receiving assembly 150 includes a coupler attachment 151 and a coupler assembly 153. The coupler attachment 151 has a coupler through hole (not shown), a coupler fastening element (not shown), coupler openings 152/152 and a pivot pin 155. The coupler assembly 153 has a receiver tube 156, receiver openings 158/158 and a retaining pin 157. Each of the at least two corresponding fixing elements 115/115 fix the U-shaped bracket structure 110 to the frame portion 14 through each of the at least two fixing holes 118/118. The receiver tube 156 is moveably attached to the coupler attachment 151 via the pivot pin 155 through the coupler openings 152/152 of the coupler attachment 151 and through holes (not shown) of the receiver tube 156. The coupler fastening element (not shown) assembles the at least one vehicle receiving assembly 150 to the side assembly hole 114 of the U-shaped bracket structure 110 via the coupler through hole (not shown). The coupler assembly 153 is configured to receive a tow arm 84 of a trailer 80 and the retaining pin 157 is configured to fix the tow arm 84 to the at least one vehicle receiving assembly 150. The retaining pin 157 is removably secured in the receiver openings 158/158 of the receiver tube 156. The receiver tube 156 is pivotal about the coupler attachment 151 via a vertical axis defined by the pivot pin 155. As illustrated the vertical axis is vertical; however, the vertical axis may vary due to various factors such as the load on the at least one vehicle 80. In the illustrated embodiments, the tow arm 84 of the trailer 80 is received in the receiver tube 156 of the coupler assembly 153; however, the embodiments are not limited thereto. As an example, the tow arm 84 of the trailer 80 may be received directly via the coupler attachment 151. When received via the coupler attachment 151 the pivot pin 155 is configured to fix the tow arm 84 of the trailer 80 to the at least one vehicle receiving assembly. In the illustrated embodiments, the coupler assembly 153 further includes a clasp 157 attached to both ends of the retaining pin 157 securing the retaining pin 157 in the receiver openings 158/158 of the receiver tube 156. In the illustrated embodiments, as an example, the coupler assembly 150 may further include a nylon strap (not shown) etc., attached to the tow arm 84 of a trailer 80 and the frame portion 14 of the bicycle 10 as an additional securing measure.

In the illustrated embodiment, the at least one vehicle 80 is a trailer 80 and the trailer 80 is at least one of a towed people trailer or cargo trailer and the one portion 84 of the at least one vehicle 80 is a tow arm 84. For illustration, a cargo trailer 80 is shown, and as an example, the cargo trailer 80 may be a grocery trailer, pet trailer, boat trailer, or work trailer used by landscapers, painters, musicians, or dog groomers etc., or a vending bicycle trailer used for craft or food sellers, or the like, having various frame types and sizes and various types of tow arms. However, in practice, the at least one vehicle 80 which is a cargo trailer 80 may be varied; as an example, a people trailer, such as a single bike trailer, double child trailer, or an adult bicycle trailer, or the like, having various frame types and sizes and various types of tow arms may be implemented and the embodiments are not limited thereto. As long as the one portion 84 of the at least one vehicle 80 has a tow arm 84 mountable to the at least one vehicle receiving assembly 150 of the vehicle towing hitch 500.

In the illustrated embodiments, the receiver tube 156 is moveably attached to the coupler attachment 151 via the pivot pin 155 through the coupler openings 152/152 of the coupler attachment 151 and through holes (not shown) of the receiver tube 156. The tow arm 84 of the trailer 80 is received in the receiver tube 156 of the coupler assembly 153 and the retaining pin 157 fixes the tow arm 84 to the at least one vehicle receiving assembly 150 through the receiver openings 158/158 of the receiver tube 156 and openings (not shown) of the tow arm 84. The clasp 157 is attached to both ends of the retaining pin 157 securing the retaining pin 157 in the openings 158 of the receiver tube 156 and openings (not shown) of the tow arm 84. In the illustrated embodiments, the tow arm 84 is not mounted to a rear wheel axle of the bicycle 10. Thus, panniers and/or footboards do need to be removed from the bicycle 10, making it simpler and convenient for a bicyclist. Also, risk of damage to the rear wheel axle of the bicycle 10 via the forces placed on the tow arm 84 when the bicycle 10 stops, starts, turns and travels up and down inclines is avoided. Moreover, tipping of the bicycle 10 when stopped or stationary via the downward forces placed on the tow arm 84 of the trailer 80 to a right or left side of the rear wheel axle of the bicycle 10, risking damage to the rear wheel axle of the bicycle 10 and/or the trailer 80 is decreased, as downward forces placed on the tow arm 84 of the trailer 80 is moved past the rear wheel of the bicycle 10, extended in a direction laterally to either of the supporting portion 314/314.

In the illustrated embodiments, the at least one vehicle receiving assembly 150 is rotatable; however, the embodiments are not limited thereto. As an example, the trailer may have a tow arm that does not rotate when mounted to the vehicle towing hitch 500 and rotate at a connection to the trailer, and the embodiments are not limited thereto. In the illustrated embodiments, the tow arm 84 of the trailer 80 is attached to a side of the trailer 80; however, the embodiments are not limited thereto. As an example, the trailer may have a tow arm that is attached to a center of the trailer, and the embodiments are not limited thereto.

Figure 21A:
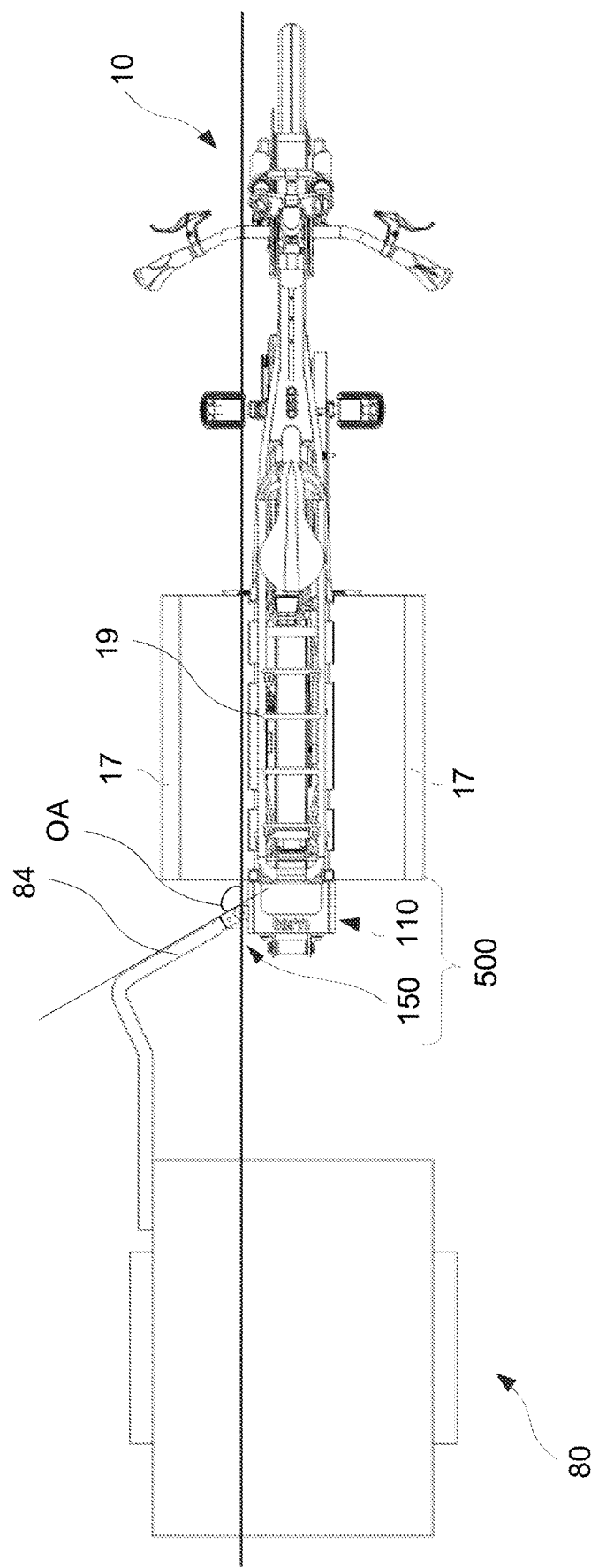
FIG. 21A illustrates a perspective view of the vehicle towing hitch of FIG. 20, towing a vehicle while assembled to a bicycle, according to disclosed embodiments.
Figure 21B:
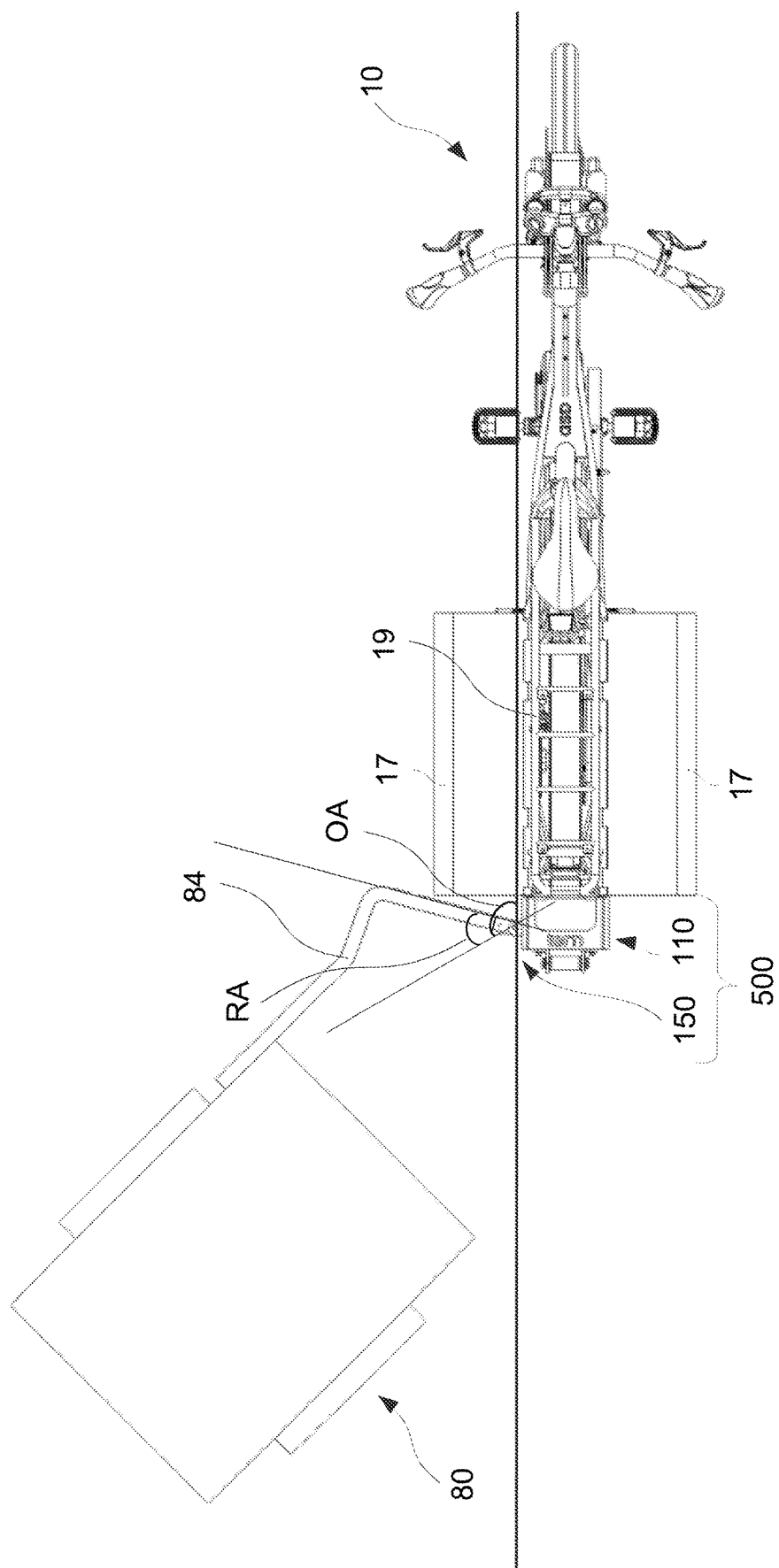
FIG. 21B illustrates a perspective view of the vehicle towing hitch of FIG. 20, towing a vehicle left while assembled to a bicycle, according to disclosed embodiments.

FIG. 21A illustrates a perspective view of the vehicle towing hitch 500 of FIG. 20, towing a vehicle 90 while assembled to a bicycle 10, according to disclosed embodiments. FIG. 21B illustrates a perspective view of the vehicle towing hitch 500 of FIG. 20, towing a vehicle 90 left while assembled to a bicycle 10, according to disclosed embodiments. As illustrated in FIGS. 21A to 21B, and FIG. 20 and FIGS. 3, 12 14, and 17, the bicycle 10 further includes the pair of panniers 17/17 on opposing sides of the rear wheel 11. A height H of the vehicle towing hitch 500, fixed to the frame portion 14, and a length L of each of the supporting portion 314/314 and the support plate 116, extending in a direction laterally beyond the length of the bicycle 10, is configured such that when the bicycle 10 is turning left or right and towing the trailer 80 and a rotational operational angle OA of the tow arm 84 when towing is 120 degrees, the tow arm 84 has at least a 45 degree rotational operational angle OA before contacting the pair of panniers 17/17 of the bicycle 10. In the illustrated embodiments, the height H of the vehicle towing hitch 500, fixed to the frame portion 14 of the bicycle 10 is between ½ and ¾ a diameter of a rear rim of the rear wheel 11 of the bicycle 10. In the illustrated embodiments, a length of the fixing portion 315/315 of each of the pair of opposing parallel arm plates 113/113 is longer than ¾ a length of the supporting portion 314/314 of each of the pair of opposing parallel arm plates 113/113 and shorter than a length of the supporting portion 314/314 of each of the pair of opposing parallel arm plates 113/113. In the illustrated embodiments, a length L of each of the supporting portion 314/314 and the support plate 116, extending in a direction laterally beyond the length of the bicycle 10, is longer than ¼ a length of a rear rim of the rear wheel 11 of the bicycle 10 and shorter than ⅓ a length of a rear rim of the rear wheel 11 of the bicycle 10 such that a downward force placed on the at least one vehicle receiving assembly 150 of the vehicle towing hitch 500 would not be far from the frame portion 14 of the bicycle 10, which if further, would make it easier for tipping of the bicycle 10 to occur, increasing accident risks for a bicyclist or damage risks to the bicycle 10 and the towed at least one vehicle 80.

As illustrated in FIGS. 1A to 1C, a bicycle 10 includes a vehicle towing hitch 100. In the illustrated embodiments, the bicycle 10 may be any type of pedal, pedal-based electric assist or electric bicycle. For illustration, a cargo bicycle 10 is shown. However, in practice, the bicycle 10 may be varied. As long as the back end 14 of the bicycle 10 has a frame portion 14 configured to receive the vehicle towing hitch 100. The cargo bicycle 10 has a frame, a front fork, a front wheel mounted to the front fork, a rear wheel 11 mounted to the frame, a frame portion 14 configured to receive the vehicle towing hitch 100, and a steering assembly having a handlebar assembled to the front fork and journaled to the frame. The cargo bicycle 10 may further have a rear carrier rack connected to the frame near to the rear wheel 11, a pair of footboards 11/11, and a pair of panniers 17/17. In the illustrated embodiments, the vehicle towing hitch 100 of the bicycle 10 includes a U-shaped bracket structure 110 and at least one vehicle receiving assembly 190. The U-shaped bracket structure 110 is configured for mounting to the bicycle 10 and towing a vehicle 90 therebehind. In the illustrated embodiments, the U-shaped bracket structure 110 of the vehicle towing hitch 100 is fixed to the frame portion 14 of the bicycle 10; however, the embodiments are not limited thereto. The U-shaped bracket structure 110 may be integrally formed with the frame portion 14 of the bicycle 10.

As illustrated in FIGS. 2 and 3, the U-shaped bracket structure 110 of the vehicle towing hitch 100 of the bicycle 10 includes a support plate 116 and a pair of opposing parallel arm plates 113/113. The shape of the U-shaped bracket structure 110 and each of the pair of opposing parallel arm plates 113/113 and dispositions thereamong are best understood as described previously and reference may be made thereto, thus, the shapes and dispositions will not be described again in detail. Each of the pair of opposing parallel arm plates 113/113 have a fixing portion 315/315 and a supporting portion 314/314. Each of the fixing portion 315/315 is configured to be fixed to a back end 14 of the bicycle and, as illustrated in FIGS. 1A to 1C, each of the supporting portion 314/314 and the support plate 116 extend in a direction laterally beyond a length of the bicycle 10. The at least one vehicle receiving assembly 190A is configured for receiving and securing one portion 94A of at least one vehicle 90 to the at least one vehicle receiving assembly 190A. The at least one vehicle receiving assembly 190A is attached to at least the support plate 116 or one of the supporting portion 314/314 of the pair of opposing parallel arm plates 113/113. When the at least one vehicle receiving assembly 190A is attached to the support plate 116, the at least one vehicle receiving assembly 190A extend in a direction laterally beyond a length of the each of the supporting portion 314/314 and the support plate 116.

In the illustrated embodiments of the bicycle 10 including the vehicle towing hitch 100, the at least one vehicle 90 being towed may be any type of pedal, pedal-based electric assist or electric bicycle. For illustration, a towed cargo bicycle 90 is shown. However, in practice, the at least one vehicle 90 may be varied; as examples, road bikes, triathlon bikes, mountain bikes, hybrid bikes, electric bikes, BMX bikes, or kids bike, or the like having various frame types and sizes and the embodiments are not limited thereto. As long as the one portion 94A of the at least one vehicle 90 has a first front fork 94A mountable to the at least one vehicle receiving assembly 190A of the vehicle towing hitch 100 of the bicycle 10.

As illustrated in FIGS. 2 and 3, each of the fixing portion 315/315 includes at least two fixing holes 118/118 separated by a distance and at least two corresponding fixing elements 115/115. In the illustrated embodiments, the at least two corresponding fixing elements 115/115 is a nut and bolt with washers; however, the embodiments are not limited thereto. Any type of fastener may be implemented, as long as each of the at least two corresponding fixing elements 115/115 fix the U-shaped bracket structure 110 to the frame portion 14 through each of the at least two fixing holes 118/118. Additionally, other means of fastening the U-shaped bracket structure 110 to the frame portion 14 of the bicycle 10 may be implemented. As an example, each of the pair of opposing parallel arm plates 113/113 may have rails (not shown) thereon which correspond to tracks (not shown) of the frame portion 14, secured by one fixing element (not shown). As long as fixing of the U-shaped bracket structure 110 to the frame portion 14 expands a distance greater than one fixing hole 118.

As illustrated in FIGS. 4A to 4B, a shape of the support plate 116 is an elongated octagonal shape and the U-shaped bracket structure 110 of the vehicle towing hitch 100 of the bicycle 10 further includes a pair of opposing parallel arm strengthening plates 117/117 and a U-shaped strengthening top plate 119. The pair of opposing parallel arm strengthening plates 117/117 and the U-shaped strengthening top plate 119 all extend perpendicular from three peripheral edges of the support plate 116 between the opposing peripheral edges of the pair of opposing parallel arm plates 113/113. The shape of the U-shaped strengthening top plate 119 and each of the pair of opposing parallel arm strengthening plates 117/117 and dispositions thereamong are best understood as described previously and reference may be made thereto, thus, the shapes and dispositions will not be described again in detail. The pair of opposing parallel arm strengthening plates 117/117 and the U-shaped strengthening top plate 119 together increase stiffness of the vehicle towing hitch 100 when the at least one vehicle receiving assembly 190A receives forces from the one portion 94A of the at least one vehicle 90 when stopping, starting, turning and travelling up and down inclines. The stiffness of the vehicle towing hitch 100 is greater with the pair of opposing parallel arm strengthening plates 117/117 and the U-shaped strengthening top plate 119 than, as an example, if only a U-shaped strengthening top plate was implemented.

As illustrated in FIGS. 4C to 6, and FIGS. 2 to 4B, the support plate 116 of the U-shaped bracket structure 110 of the vehicle towing hitch 100 of the bicycle 10 includes at least a first set of four assembly holes 112A/112A/112A/ 112A and the at least one vehicle receiving assembly 190A of the vehicle towing hitch 100 of the bicycle 10 includes a first conversion shaft sleeve 196A, a first pair of axle adapters 197A/197A, a pair of L-shaped mounts 193/193, and a first thru-axle quick release front fork clamp 199A. Each pair of L-shaped mounts 193/193 includes an assembly portion 191 having two fastening holes 192/192 separated by a distance and two corresponding fastening elements 195/195 and a mounting portion 198 including one through hole 194 extending perpendicularly from an edge of the assembly portion 191. A size of a core diameter of the first pair of axle adapters 197A/197A is the same as a size of a diameter of a thru-axle of the first thru-axle quick release front fork clamp 199A. As shown in FIGS. 7 to 8, and FIGS. 2 to 3 and 5 to 6, one end of each of the first pair of axle adapters 197A/197A, correspond partially within opposing openings of the first conversion shaft sleeve 196A and the other end of each of the first pair of axle adapters 197/197A, correspond partially within and through each of the one through hole 194 of the mounting portion 198 of the pair of L-shaped mounts 193/193. As illustrated in FIGS. 9 to 12, the two corresponding fastening elements 195/195 of each of the pair of L-shaped mounts 193/193 assemble the pair of L-shaped mounts 193/193, the first pair of axle adapters 197/197A, and the first conversion shaft sleeve 196A to the support plate 116 through two of the at least a first set of four assembly holes 112A/112/112/112A, respectively. The first thru-axle quick release front fork clamp 199A is assembled and disengaged through each of the one through hole 194 of the mounting portion 198 of the pair of L-shaped mounts 193/193, the first pair of axle adapters 197A/197A, and the first conversion shaft sleeve 196A. In the illustrated embodiments, the first thru-axle quick release front fork clamp 199A is configured to clamp the first front fork 94A to the at least one vehicle receiving assembly 190A; however, the embodiments are not limited thereto. A thru axle front fork clamp of the at least one vehicle 90 may also clamp the first front fork 94A to the at least one vehicle receiving assembly 190A. As an example, a thru axle front fork clamp of a towed road bike, triathlon bike, mountain bike, hybrid bike, cargo bike, electric bike, BMX bike, or kids bike, or the like may also be used as the first thru-axle quick release front fork clamp 199A for assembly and disengagement through each of the one through hole 194 of the mounting portion 198 of the pair of L-shaped mounts 193/193, the first pair of axle adapters 197A/197A, and the first conversion shaft sleeve 196A and clamping of the first front fork 94A of the towed road bike, triathlon bike, mountain bike, hybrid bike, cargo bike, electric bike, BMX bike, or kids bike, or the like to the at least one vehicle receiving assembly 190A.

In the illustrated embodiments, the support plate 116 of the U-shaped bracket structure 110 of the vehicle towing hitch 100 of the bicycle 10 includes a first set of four assembly holes 112A/112A/112A/112A, the at least one vehicle receiving assembly 190A of the vehicle towing hitch 100 of the bicycle 10 includes a first conversion shaft sleeve 196A, a first pair of axle adapters 197A/197A, and a first thru-axle quick release front fork clamp 199A, and the one portion 94A of the at least one vehicle 90 is a first front fork 94A; however, the embodiments are not limited thereto. As illustrated in FIGS. 13 to 15C, the support plate 116 of the U-shaped bracket structure 110 of the vehicle towing hitch 300 of the bicycle 10 further includes a second set of four assembly holes 112B/112B/112B/112B, the at least one vehicle receiving assembly 190B of the vehicle towing hitch 300 of the bicycle 10 further includes a second conversion shaft sleeve 196B, a second pair of axle adapters 197B/ 197B, and a second thru-axle quick release front fork clamp 199B, and the one portion 94B of the at least one vehicle is a second front fork 94B having a different axle length than the first front fork 94A. The second set of four assembly holes 112B/112B/112B/112B are disposed between the first set of four assembly holes 112A/112A/112A/112A or disposed on outer sides of the first set of four assembly holes 112C/112C/112C/112C. As illustrated in FIGS. 16 to 17 and 14 and FIGS. 2, 3, 9 and 11, a length of the second conversion shaft sleeve 196B is different from a length of the first conversion shaft sleeve 196A, and a size of a core diameter of the second pair of axle adapters 1976/197B and a size of a diameter of a thru-axle of the second thru-axle quick release front fork clamp 1996 is different from the size of the core diameter of the first pair of axle adapters 197/197A and the size of the diameter of the thru-axle of the first thru-axle quick release front fork clamp 199A. The second conversion shaft sleeve 196B, the second pair of axle adapters 1976/197B, and the second thru-axle quick release front fork clamp 199B, is interchangeable with the first conversion shaft sleeve 196A, the first pair of axle adapters 197A/197A, and the first thru-axle quick release front fork clamp 199A. The two corresponding fastening elements 195/195 of each of the pair of L-shaped mounts 193/193 assemble the pair of L-shaped mounts 193/193, the second conversion shaft sleeve 196B and, the second pair of axle adapters 1976/197B and the second thru-axle quick release front fork clamp 1996 or the first pair of axle adapters 197A/197A and the first thru-axle quick release front fork clamp 199A, to the support plate 116 through two of the at least a second set of four assembly holes 112B/112B/112B/ 112B, respectively, when a length of the second conversion shaft sleeve 196B is shorter than a length of the first conversion shaft sleeve 196A or through two of the at least a second set of four assembly holes 112C/112C/112C/112C, respectively, when a length of the second conversion shaft sleeve 196B is longer than a length of the first conversion shaft sleeve 196A. The second thru-axle quick release front fork clamp 199B or the first thru-axle quick release front fork clamp 199A is assembled and disengaged through each of the one through hole 194 of the mounting portion 198 of the pair of L-shaped mounts 193/193, the second conversion shaft sleeve 196B, and the second pair of axle adapters 1976/197B and the second thru-axle quick release front fork clamp 199B or the first pair of axle adapters 197A/197A and the first thru-axle quick release front fork clamp 199A. The second thru-axle quick release front fork clamp 199B and the first thru-axle quick release front fork clamp 199A is configured to clamp a second front fork 94B to the at least one vehicle receiving assembly 190B.

As illustrated in FIGS. 13 to 17, the assembly portion 191 of at least one of the pair of L-shaped mounts 193/193 is assembled to the support plate 116 facing a center of the support plate 116 or, as illustrated in FIGS. 2 to 4D, 9 to 7, and 11 to 12, the assembly portion 191 of at least one of the pair of L-shaped mounts 193/193 is assembled to the support plate 116 facing an edge of the support plate 116, or any combination of the foregoing.

In the illustrated embodiments, the support plate 116 of the U-shaped bracket structure 110 of the vehicle towing hitch of the bicycle 10 includes three sets of four assembly holes 112A/112A/112A/112A, 112B/112B/112B/112B, 112C/112C/112C/112C; however, the embodiments are not limited thereto. The support plate 116 of the U-shaped bracket structure 110 of the vehicle towing hitch of the bicycle 10 may include more or less than three sets of four assembly holes. In the illustrated embodiments, different diameters and widths or spacings of a front wheel thru-axle and front fork blades of a towed road bike, triathlon bike, mountain bike, hybrid bike, cargo bike, electric bike, BMX bike, or kids bike, or the like may be mounted to the at least one vehicle receiving assembly via the sets of four assembly holes, different direction of assembly of the assembly portion 191 of each of the pair of L-shaped mounts 193/193, variable sizes of the core diameter of the pair of axle adapters and diameter of a thru-axle of the thru-axle quick release front fork clamp, and variable lengths of a thru-axle of the thru-axle quick release front fork clamp and the conversion shaft sleeve. Examples of different diameter thru-axle sizes and different widths or spacings of front fork blades are best understood as described previously and reference may be made thereto, thus, the different diameters and widths will not be described again in detail. Moreover, in the illustrated embodiments, small incremental differences in widths of the front fork, as an example, 10 mm or less, may be available via the variable direction of assembly of the assembly portion 191 of each of the pair of L-shaped mounts 193/193 facing a center of the support plate 116 or facing an edge of the support plate 116. Without the variable direction of assembly of the assembly portion 191, small incremental differences in widths of the front fork would not be available as the sets of four assembly holes may be too close together or overlap due to the diameter of the fastener. Furthermore, in the illustrated embodiments, the direction of assembly of the assembly portion 191 avoids contact of a portion of the first front fork 94A, second front fork 94B, or other front forks, as an example, a front disc brake mount etc., with any of the two corresponding fastening elements 195/195 of each of the pair of L-shaped mounts 193/193 when the first front fork 94A, second front fork 94B, or other front forks, respectfully, rotate when traveling up and down inclines.

As illustrated in FIGS. 18A to 18E, and FIGS. 3, 12 14, and 17, the bicycle 10 further includes a longtail 19 above a rear wheel 11. A height H of the vehicle towing hitch 100, fixed to the frame portion 14, and a length L of each of the supporting portion 314/314 and the support plate 116, extending in a direction laterally beyond the length of the bicycle 10, and the at least one vehicle receiving assembly 190A, extending in a direction laterally beyond the length of each of the supporting portion 314/314 and the support plate 116, is configured such that when a diameter of a rear wheel 11 of the at least one vehicle 90 is the same as or smaller than the rear wheel 11 of the bicycle 10 and both are traveling up and down inclines, a first front fender 91 of the first front fork 94A or a second front fender of the second front fork 94B has at least a 35 degree rotational allowance angle AA before contacting the longtail 19 of the bicycle 10. In the illustrated embodiments, a mounted angle M of a first front fender of the first front fork or second front fender of the second front fork of the at least one vehicle from an end of the first front fork or the second front fork to a center of the vehicle towing hitch 100 parallel to the ground, is at least 95 degrees. In the illustrated embodiments, the height H of the vehicle towing hitch 100, fixed to the frame portion 14 of the bicycle 10 is between ½ and ¾ a diameter of a rear rim of the rear wheel 11 of the bicycle 10. If the height H of the vehicle towing hitch 100, fixed to the frame portion 14 of the bicycle 10 is lower than ½ a diameter of a rear rim of the rear wheel 11 of the bicycle 10, the mounted angle M of the front fork of the at least one vehicle 90 from an end of the front fork to a center of the vehicle towing hitch 100 parallel to the ground, would be less than 95 degrees and when a diameter of a rear wheel 11 of the at least one vehicle 90 is the same as or smaller than the rear wheel 11 of the bicycle 10 and both are traveling up and down inclines, a first front fender 91 of the first front fork 94A or a second front fender of the second front fork 94B would be less than the 35 degree rotational allowance angle AA before contacting the longtail 19 of the bicycle 10. Moreover, if the height H of the vehicle towing hitch 100, fixed to the frame portion 14 of the bicycle 10 is lower than ½ a diameter of a rear rim of the rear wheel 11 of the bicycle 10, a downward force placed on the at least one vehicle receiving assembly 190A of the vehicle towing hitch 100 would increase, making it easier for wheelies of the bicycle 10 to occur, increasing accident risks for a bicyclist or damage risks to the bicycle 10 and the towed at least one vehicle 90. If the height H of the vehicle towing hitch 100, fixed to the frame portion 14 of the bicycle 10 is greater than ¾ a diameter of a rear rim of the rear wheel 11 of the bicycle 10, the mounted angle M of the front fork of the at least one vehicle 90 from an end of the first front fork 94A to a center of the vehicle towing hitch 100 parallel to the ground, would be greater than 95 degrees, making it easier for the towed at least one vehicle 90 to flip to a side when the bicycle 10 is turning left and right, as the towed at least one vehicle 90 would be mounted more vertically. In the illustrated embodiments, a length of the fixing portion 315/315 of each of the pair of opposing parallel arm plates 113/113 is longer than ¾ a length of the supporting portion 314/314 of each of the pair of opposing parallel arm plates 113/113 and shorter than a length of the supporting portion 314/314 of each of the pair of opposing parallel arm plates 113/113. In the illustrated embodiments, a length L of each of the supporting portion 314/314 and the support plate 116, extending in a direction laterally beyond the length of the bicycle 10, is longer than ¼ a length of a rear rim of the rear wheel 11 of the bicycle 10 and shorter than ⅓ a length of a rear rim of the rear wheel 11 of the bicycle 10 such that a downward force placed on the at least one vehicle receiving assembly 190A of the vehicle towing hitch 100 would not be far from the frame portion 14 of the bicycle 10, which if further away, would make it easier for wheelies of the bicycle 10 to occur, increasing accident risks for a bicyclist or damage risks to the bicycle 10 and the towed at least one vehicle 90.

As illustrated in FIGS. 19A to 20, each of the fixing portion 315/315 of the pair of opposing parallel arm plates 113/113 of the U-shaped bracket structure 110 of the vehicle towing hitch 500 of the bicycle 10 includes at least two fixing holes 118/118 separated by a distance and at least two corresponding fixing elements 115/115. At least one of the supporting portion 314/314 of the pair of opposing parallel arm plates 113/113 includes at least a side assembly hole 114 and the at least one vehicle receiving assembly 150 includes a coupler attachment 151 and a coupler assembly 153. The coupler attachment 151 has a coupler through hole (not shown), a coupler fastening element (not shown), coupler openings 152/152 and a pivot pin 155. The coupler assembly 153 has a receiver tube 156, receiver openings 158/158 and a retaining pin 157. Each of the at least two corresponding fixing elements 115/115 fix the U-shaped bracket structure 110 to the frame portion 14 through each of the at least two fixing holes 118/118. The receiver tube 156 is moveably attached to the coupler attachment 151 via the pivot pin 155 through the coupler openings 152/152 of the coupler attachment 151 and through holes (not shown) of the receiver tube 156. The coupler fastening element (not shown) assembles the at least one vehicle receiving assembly 150 to the side assembly hole 114 of the U-shaped bracket structure 110 via the coupler through hole (not shown). The coupler assembly 153 is configured to receive a tow arm 84 of a trailer 80 and the retaining pin 157 is configured to fix the tow arm 84 to the at least one vehicle receiving assembly 150. The retaining pin 157 is removably secured in the receiver openings 158/158 of the receiver tube 156. The receiver tube 156 is pivotal about the coupler attachment 151 via a vertical axis defined by the pivot pin 155. As illustrated the vertical axis is vertical; however, the vertical axis may vary due to various factors such as the load on the at least one vehicle 80. In the illustrated embodiments, the tow arm 84 of the trailer 80 is received in the receiver tube 156 of the coupler assembly 153; however, the embodiments are not limited thereto. As an example, the tow arm 84 of the trailer 80 may be received directly via the coupler attachment 151. When received via the coupler attachment 151 the pivot pin 155 is configured to fix the tow arm 84 of the trailer 80 to the at least one vehicle receiving assembly. In the illustrated embodiments, the coupler assembly 153 further includes a clasp 157 attached to both ends of the retaining pin 157 securing the retaining pin 157 in the receiver openings 158/158 of the receiver tube 156. In the illustrated embodiments, as an example, the coupler assembly 150 may further include a nylon strap (not shown) etc., attached to the tow arm 84 of a trailer 80 and the frame portion 14 of the bicycle 10 as an additional securing measure.

In the illustrated embodiments of the bicycle 10 having the vehicle towing hitch 500, the at least one vehicle 80 is a trailer 80 and the trailer 80 is at least one of a towed people trailer or cargo trailer and the one portion 84 of the at least one vehicle 80 is a tow arm 84. Examples of people trailers and cargo trailers are best understood as described previously and reference may be made thereto, thus, the types and sizes of trailers and various types of tow arms will not be described again in detail.

In the illustrated embodiments of the bicycle 10 having the vehicle towing hitch 500, the receiver tube 156 is moveably attached to the coupler attachment 151 via the pivot pin 155 through the coupler openings 152/152 of the coupler attachment 151 and through holes (not shown) of the receiver tube 156. The tow arm 84 of the trailer 80 is received in the receiver tube 156 of the coupler assembly 153 and the retaining pin 157 fixes the tow arm 84 to the at least one vehicle receiving assembly 150 through the receiver openings 158/158 of the receiver tube 156 and openings (not shown) of the tow arm 84. The clasp 157 is attached to both ends of the retaining pin 157 securing the retaining pin 157 in the openings 158 of the receiver tube 156 and openings (not shown) of the tow arm 84. In the illustrated embodiments, the tow arm 84 is not mounted to a rear wheel axle of the bicycle 10. Thus, panniers and/or footboards do need to be removed from the bicycle 10, making it simpler and convenient for a bicyclist. Also, risk of damage to the rear wheel axle of the bicycle 10 via the forces placed on the tow arm 84 when the bicycle 10 stops, starts, turns and travels up and down inclines is avoided.

Moreover, tipping of the bicycle 10 when stopped or stationary via the downward forces placed on the tow arm 84 of the trailer 80 to a right or left side of the rear wheel axle of the bicycle 10, risking damage to the rear wheel axle of the bicycle 10 and/or the trailer 80 is decreased, as downward forces placed on the tow arm 84 of the trailer 80 is moved past the rear wheel of the bicycle 10, extended in a direction laterally to either of the supporting portion 314/314.

In the illustrated embodiments of the bicycle 10 having the vehicle towing hitch 500, the at least one vehicle receiving assembly 150 is rotatable; however, the embodiments are not limited thereto. As an example, the trailer may have a tow arm that does not rotate when mounted to the vehicle towing hitch 500 and rotate at a connection to the trailer, and the embodiments are not limited thereto. In the illustrated embodiments, the tow arm 84 of the trailer 80 is attached to a side of the trailer 80; however, the embodiments are not limited thereto. As an example, the trailer may have a tow arm that is attached to a center of the trailer, and the embodiments are not limited thereto.

As illustrated in FIGS. 21A to 21B, and FIG. 20 and FIGS. 3, 12 14, and 17, the bicycle 10 further includes the pair of panniers 17/17 on opposing sides of the rear wheel 11. A height H of the vehicle towing hitch 500, fixed to the frame portion 14, and a length L of each of the supporting portion 314/314 and the support plate 116, extending in a direction laterally beyond the length of the bicycle 10, is configured such that when the bicycle 10 is turning left or right and towing the trailer 80 and a rotational operational angle OA of the tow arm 84 when towing is 120 degrees, the tow arm 84 has at least a 45 degree rotational operational angle OA before contacting the pair of panniers 17/17 of the bicycle 10. In the illustrated embodiments, the height H of the vehicle towing hitch 500, fixed to the frame portion 14 of the bicycle 10 is between ½ and ¾ a diameter of a rear rim of the rear wheel 11 of the bicycle 10. In the illustrated embodiments, a length of the fixing portion 315/315 of each of the pair of opposing parallel arm plates 113/113 is longer than ¾ a length of the supporting portion 314/314 of each of the pair of opposing parallel arm plates 113/113 and shorter than a length of the supporting portion 314/314 of each of the pair of opposing parallel arm plates 113/113. In the illustrated embodiments, a length L of each of the supporting portion 314/314 and the support plate 116, extending in a direction laterally beyond the length of the bicycle 10, is longer than ¼ a length of a rear rim of the rear wheel 11 of the bicycle 10 and shorter than ⅓ a length of a rear rim of the rear wheel 11 of the bicycle 10 such that a downward force placed on the at least one vehicle receiving assembly 150 of the vehicle towing hitch 500 would not be far from the frame portion 14 of the bicycle 10, which if further, would make it easier for tipping of the bicycle 10 to occur, increasing accident risks for a bicyclist or damage risks to the bicycle 10 and the towed at least one vehicle 80.

In the illustrated embodiments, a material of the U-shaped bracket structure 110 may be steel; however, the embodiments are not limited thereto. A material of the U-shaped bracket structure 110 may be steel, steel-alloy, stainless steel, aluminum, or aluminum-alloy or any combination of the foregoing. In the illustrated embodiments, a material of the pair of L-shaped mounts 193/193 may be aluminum; however, the embodiments are not limited thereto. A material of the pair of L-shaped mounts 193/193 may be steel, steel alloy, stainless steel, aluminum, or aluminum-alloy or any combination of the foregoing. In the illustrated embodiments, a material of the conversion shaft sleeve 196A, 196B may be aluminum; however, the embodiments are not limited thereto. A material of the conversion shaft sleeve 196A, 196B may be steel, steel alloy, stainless steel, aluminum, aluminum-alloy, or reinforced plastic, or any combination of the foregoing. In the illustrated embodiments, a material of the pair of axle adapters 197A/197A, 1976/197B may be plastic, as an example, thermoplastic or reinforced plastic; however, the embodiments are not limited thereto. A material of the pair of axle adapters 197A/197A, 1976/197B may be steel, steel alloy, stainless steel, aluminum, or aluminum-alloy or any combination of the foregoing. In the illustrated embodiments, a material of the thru-axle quick release front fork clamp 199A, 199B may be aluminum; however, the embodiments are not limited thereto. A material of the pair of the thru-axle quick release front fork clamp 199A, 199B may be steel, steel alloy, stainless steel, aluminum, aluminum-alloy, or reinforced plastic, or any combination of the foregoing. In the illustrated embodiments, a surface treatment may be applied to the U-shaped bracket structure 110, the pair of L-shaped mounts 193/193, the conversion shaft sleeve 196A, 196B, the pair of axle adapters 197A/197A, 1976/197B, and the thru-axle quick release front fork clamp 199A, 199B for protection and rust prevention etc.

A vehicle towing hitch 100, 300, 500 for towing a vehicle 90, 80 including a U-shaped bracket structure 110 and at least one vehicle receiving assembly 190A, 190B, 150 is provided. The U-shaped bracket structure 110 is mountable to a bicycle 10 and includes a support plate 116 and pair of opposing parallel arm plates 113/113. Each of the pair of opposing parallel arm plates 113/113 have a fixing portion 315/315 and supporting portion 314/314. Each of the fixing portion 315/315 is configured to be fixed to a back end 14 of the bicycle and each of the supporting portion 314/314 and the support plate 116 extend in a direction laterally beyond a length of the bicycle 10. The at least one vehicle receiving assembly 190A, 190B, 150 is configured for receiving and securing one portion 94A, 94B, 84 of at least one vehicle 90A, 90B, 80 thereto. The at least one vehicle receiving assembly 190A, 190B, 150 is attached to at least the support plate 116 or one of the supporting portion 314/314 of the pair of opposing parallel arm plates 113/113.

As illustrated, the vehicle towing hitch 100, 300 of the embodiments provides parents or bicyclists to have their child or other bicyclists ride safely on the back of their bicycles 10 when traveling, as an example, to a bike park, with the child and the child's bike, or elsewhere, with the other bicyclists and the other bicyclists bike. Each of the fixing portion 315/315 includes at least two fixing holes 118/118 separated by a distance and at least two corresponding fixing elements 115/115 securely fixing the U-shaped bracket structure 110 to the frame portion 14 of the bicycle 10. The length of the fixing portion 315/315 of each of the pair of opposing parallel arm plates 113/113 being longer than ¾ a length of the supporting portion 314/314 of each of the pair of opposing parallel arm plates 113/113 and shorter than the length of the supporting portion 314/314 of each of the pair of opposing parallel arm plates 113/113 and the separated distance of the at least two fixing holes 118/118 of each of the fixing portion 315/315 increases a load that may be placed on the at least one vehicle receiving assembly 190A, 190B. The pair of opposing parallel arm strengthening plates 117/117 and the U-shaped strengthening top plate 119 together increase stiffness of the vehicle towing hitch 100, 300 when the at least one vehicle receiving assembly 190 receives forces from the one portion 94A, 794B of the at least one vehicle 90 when stopping, starting, turning and travelling up and down inclines. With each of the supporting portion 314/314 and the support plate 116 extending in a direction laterally beyond a length of the frame portion 14 of the bicycle 10 and the at least one vehicle receiving assembly 190A, 190B being attached to the support plate 116 extending in a direction laterally beyond a length of the supporting portion 314/314 and the support plate 116, panniers and/or footboards of the bicycles 10 are not be required to be removed making it less time consuming and more convenient for the parents or bicyclists. Also, as a front wheel of the towed bike is not required to be attached to panniers or footboards of the bicycle 10 for towing, thus, it is safer for passengers of the parents or bicyclists as their feet are not hindered when hanging downward to sides of the rear wheel. Moreover, scratches or damage of the bicycle 10 and towed bikes when turning and travelling up and down inclines are avoided via the extended direction of the vehicle towing hitch 100, 300.

As illustrated, the vehicle towing hitch 100, 300 of the embodiments also provides a bicyclists to tow one specialty bicycle, as an example, a mountain bike, to a desired location for riding. Thus, making it less time consuming and tiring for the bicyclists as opposed to walking with both bikes, making it less dangerous for bicyclist and less risky for damage to either or both bicycles as opposed to carrying one bicycle, and making it less dangerous for bicyclist, less risky for damage to either or both bicycles, and less difficult to turn right and left and traveling up and down inclines as opposed to pushing one bike with one hand while riding the other bicycle. Also, as a front wheel of their bicycle would not need to be attached to panniers or footboards of their bicycle 10, it would be easier to turn right and left, and avoid scratches or damage of their bicycle 10 and their specialty bicycle when turning and travelling up and down inclines.

Furthermore, the at least one vehicle receiving assembly 190A, 190B of the vehicle towing hitch 100, 300 of the embodiments may be interchanged for receiving and securing one portion of, for example, road bikes, triathlon bikes, mountain bikes, cargo bikes, hybrid bikes, electric bikes, BMX bikes, or kids bikes thereto, via the sets of four assembly holes 112A/112A/112A/112A, 112B/112B/112B/112B, 112C/112C/112C/112C, different direction of assembly of the assembly portion 191 of each of the pair of L-shaped mounts 193/193 facing a center of the support plate 116 or facing an edge of the support plate 116, variable sizes of the core diameter of the pair of axle adapters 197/197A, 197B/197B and diameter of a thru-axle of the thru-axle quick release front fork clamp 199A/199B, variable lengths of a thru-axle of the thru-axle quick release front fork clamp 199A/199B and the conversion shaft sleeve conversion shaft sleeve 196A, 196B and interchangeability of the second conversion shaft sleeve 196B, the second pair of axle adapters 197B/197B, and the second thru-axle quick release front fork clamp 199B with the first conversion shaft sleeve 196A, the first pair of axle adapters 197A/197A, and the first thru-axle quick release front fork clamp 199A.

Additionally, the vehicle towing hitch 500 of the embodiments may be configured for receiving and securing one portion of people trailers or cargo trailers thereto. The trailers are not mounted to couplers or adapters attached to a rear wheel axle of the bicycle 10. Thus, panniers and/or footboards do need to be removed from the bicycle 10, making it simpler and convenient for a bicyclist. Also, risk of damage to the rear wheel axle of the bicycle 10 via the forces placed on the tow arm 84 when the bicycle 10 stops, starts, turns and travels up and down inclines is avoided. Moreover, tipping of the bicycle 10 when stopped or stationary via the downward forces placed on the tow arm 84 of the trailer 80 to a right or left side of the rear wheel axle of the bicycle 10, risking damage to the rear wheel axle of the bicycle 10 and/or the trailer 80 is decreased, as downward forces placed on the tow arm 84 of the trailer 80 is moved past the rear wheel of the bicycle 10, extended in a direction laterally to either of the supporting portion 314/314.

The height H of the vehicle towing hitch 100, 300 of the embodiments, between ½ and ¾ a diameter of a rear rim of the rear wheel 11 of the bicycle and the length L of each of the supporting portion 314/314 and the support plate 116, extending in a direction laterally beyond the length of the bicycle 10, being longer than ¼ a length of a rear rim of the rear wheel 11 of the bicycle 10 and shorter than ⅓ a length of a rear rim of the rear wheel 11 of the bicycle 10, provide for a rotational allowance angle AA before any part of the towed at least one vehicle contact any part of the bicycle 10, when a diameter of a rear wheel 11 of the at least one vehicle is the same as or smaller than the rear wheel 11 of the bicycle 10 and both are traveling up and down inclines. Also, the height H and length L provide for downward forces placed on the at least one vehicle receiving assembly 190A, 190B of the vehicle towing hitch 100, 300 to not be far from the frame portion 14 of the bicycle 10, which if further away, would make it easier for wheelies of the bicycle 10 to occur, increasing accident risks for the parents or bicyclists or damage risks to the bicycle 10 and the towed at least one vehicle, and provide for the at least one vehicle to not be mounted more vertically, preventing flipping to a side of the at least one vehicle. Furthermore, the direction of assembly of the assembly portion 191 avoids contact of a portion of the first front fork 94A, second front fork 94B, or other front forks, as an example, a front disc brake mount etc., with any of the two corresponding fastening elements 195/195 of each of the pair of L-shaped mounts 193/193 when the first front fork 94A, second front fork 94B, or other front forks, respectfully, rotate when traveling up and down inclines. The height H of the vehicle towing hitch 500 of the embodiments and the length L of each of the supporting portion 314/314 and the support plate 116, extending in a direction laterally beyond the length of the bicycle 10 provides for an operating angle OA of a tow arm of a towed at least one vehicle before any part of the tow arm contact any part of the bicycle 10. Also, downward forces placed on the at least one vehicle receiving assembly 150 of the vehicle towing hitch 500 is not far from the frame portion 14 of the bicycle 10, making it more difficult for tipping of the bicycle 10 to occur, decreasing accident risks for parents or bicyclists or damage risks to the bicycle and the towed at least one vehicle.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A vehicle towing hitch, comprising:
   a U-shaped bracket structure, configured for mounting to a bicycle, the U-shaped bracket structure including a support plate and a pair of opposing parallel arm plates extending perpendicular from two opposing peripheral edges of the support plate, each of the pair of opposing parallel arm plates having a fixing portion and a supporting portion, the supporting portion extending perpendicular from the opposing peripheral edges of the support plate, whereby each of the fixing portion is configured to be fixed to a back end of the bicycle and each of the supporting portion and the support plate extend in a direction laterally beyond a length of the bicycle; and
   at least one vehicle receiving assembly, configured for receiving and securing one portion of at least one vehicle to the at least one vehicle receiving assembly, attached to at least the support plate or one of the supporting portion of the pair of opposing parallel arm plates,
   wherein the one portion of at least one vehicle has a width as measured parallel to the support plate, and at least one of the at least one vehicle receiving assembly or the U-shaped bracket structure being configured to permit the at least one vehicle receiving assembly to receive and secure the one portion of at least one vehicle for a range of widths of the one portion of at least one vehicle.

2. The vehicle towing hitch of claim 1, wherein a shape of the support plate is an elongated octagonal shape and the U-shaped bracket structure further includes a pair of opposing parallel arm strengthening plates and a U-shaped strengthening top plate all extending perpendicular from three peripheral edges of the support plate between the opposing peripheral edges of the pair of opposing parallel arm plates, a second edge of each of the pair of opposing parallel arm strengthening plates extends from a third edge of each of the pair of opposing parallel arm plates and at least a portion of a third edge of each of the pair of opposing parallel arm strengthening plates extends from second edges of the U-shaped strengthening fop plate, whereby the pair of opposing parallel arm strengthening plates and the U-shaped strengthening top plate together increase stiffness of the vehicle towing hitch when the at least one vehicle receiving assembly receives forces from the one portion of the at least one vehicle when stopping, starting, turning and travelling up and down inclines.

3. The vehicle towing hitch of claim 1, wherein each of the fixing portion includes at least two fixing holes separated by a distance and at least two corresponding fixing elements, the bicycle is at least one of a pedal, pedal-based electric assist or electric bicycle, wherein the back end of the bicycle is a frame portion of the bicycle configured to receive the vehicle towing hitch, and the at least one vehicle is a towed bicycle and the towed bicycle is at least one of a pedal, pedal-based electric assist or electric bicycle, wherein the one portion of the at least one vehicle is a first front fork, whereby the at least two corresponding fixing elements fix the U-shaped bracket structure to the frame portion through each of the at least two fixing holes, and the first front fork is mounted to the at least one vehicle receiving assembly.

4. The vehicle towing hitch of claim 3, wherein the support plate includes at least a first set of four assembly holes, and the at least one vehicle receiving assembly includes a first conversion shaft sleeve, a first pair of axle adapters, a pair of L-shaped mounts, and a first thru-axle quick release front fork clamp, each of the pair of L-shaped mounts includes an assembly portion having two fastening holes separated by a distance and two corresponding fastening elements and a mounting portion extending perpendicular from an edge of the assembly portion, the mounting portion including one through hole, and a size of a core diameter of the first pair of axle adapters is the same as a size of a diameter of a thru-axle of the first thru-axle quick release front fork clamp, and wherein one end of each of the first pair of axle adapters, correspond partially within opposing openings of the first conversion shaft sleeve, and the other end of each of the first pair of axle adapters, correspond partially within and through the one through hole of the mounting portion, whereby the two corresponding fastening elements of each of the pair of L-shaped mounts assemble the pair of L-shaped mounts, the first pair of axle adapters, and the first conversion shaft sleeve to the support plate through two of the at least a first set of four assembly holes, respectively, and the first thru-axle quick release front fork clamp is assembled through each of the one through hole of the mounting portion, the first pair of axle adapters, and the first conversion shaft sleeve, wherein the first thru-axle quick release front fork clamp is configured to clamp the first front fork to the at least one vehicle receiving assembly.

5. The vehicle towing hitch of claim 4, wherein the support plate further includes a second set of four assembly holes, the at least one vehicle receiving assembly further includes a second conversion shaft sleeve, a second pair of axle adapters, and a second thru-axle quick release front fork clamp, and the one portion of the at least one vehicle is a second front fork having a different axle length than the first front fork, and wherein the second set of four assembly holes are disposed between the first set of four assembly holes or disposed on outer sides of the first set of four assembly holes, a length of the second conversion shaft sleeve is different from a length of the first conversion shaft sleeve, and a size of a core diameter of the second pair of axle adapters and a size of a diameter of a thru-axle of the second thru-axle quick release front fork clamp is different from the size of the core diameter of the first pair of axle adapters and the size of the diameter of the thru-axle of the first thru-axle quick release front fork clamp, whereby the second conversion shaft sleeve, the second pair of axle adapters, and the second thru-axle quick release front fork clamp, is interchangeable with the first conversion shaft sleeve, the first pair of axle adapters, and the first thru-axle quick release front fork clamp, and the two corresponding fastening elements of each of the pair of L-shaped mounts assemble the pair of L-shaped mounts, the second conversion shaft sleeve and, the second pair of axle adapters and the second thru-axle quick release front fork clamp or the first pair of axle adapters and the first thru-axle quick release front fork clamp, to the support plate through two of the at least a second set of four assembly holes, respectively, when a length of the second conversion shaft sleeve is shorter than a length of the first conversion shaft sleeve or a length of the second conversion shaft sleeve is longer than a length of the first conversion shaft sleeve, and the second thru-axle quick release front fork clamp or the first thru-axle quick release front fork clamp is assembled through each of the one through hole of the mounting portion, the second conversion shaft sleeve, and the second pair of axle adapters or the first pair of axle adapters, respectively, wherein the second thru-axle quick release front fork clamp and the first thru-axle quick release front fork clamp is configured to clamp a second front fork to the at least one vehicle receiving assembly.

6. The vehicle towing hitch of claim 5, wherein the assembly portion of at least one of the pair of L-shaped mounts is assembled to the support plate facing a center of the support plate or the assembly portion of at least one of the pair of L-shaped mounts is assembled to the support plate facing an edge of the support plate, or any combination of the foregoing, whereby the direction of assembly of the assembly portion avoids contact of a portion of the first front fork or second front fork with any of the two corresponding fastening elements of each of the pair of L-shaped mounts when the first front fork or second front fork, respectfully, rotates when traveling up and down inclines.

7. The vehicle towing hitch of claim 6, wherein the bicycle further includes a rear carrier rack above a rear wheel, and wherein a height of the vehicle towing hitch fixed to the frame portion and a length of each of the supporting portion and the support plate and the at least one vehicle receiving assembly extending in a direction laterally beyond the length of the bicycle is configured such that when traveling up and down inclines and towing the towed bicycle, and a mounted angle of a first front fender of the first front fork or a second front fender of the second front fork to a center of the vehicle towing hitch parallel to the ground is at least 95 degrees, the first front fender or the second front fender has at least a 35 degree rotational allowance angle before contacting the rear carrier rack of the bicycle.

8. The vehicle towing hitch of claim 1, wherein each of the fixing portion includes at least two fixing holes separated by a distance and at least two corresponding fixing elements, the bicycle is at least one of a pedal, pedal-based electric assist or electric bicycle, wherein the back end of the bicycle is a frame portion of the bicycle configured to receive the vehicle towing hitch, and the at least one vehicle is trailer and the trailer is at least one of a towed people trailer or cargo trailer and the one portion of the at least one vehicle is a tow arm, whereby each of the at least two corresponding fixing elements fix the U-shaped bracket structure to the frame portion through each of the at least two fixing holes, and the tow arm is mounted to the at least one vehicle receiving assembly.

9. A vehicle towing hitch comprising:
a U-shaped bracket structure, configured for mounting to a bicycle, the U-shaped bracket structure including a support plate and a pair of opposing parallel arm plates extending perpendicular from two opposing peripheral edges of the support plate, each of the pair of opposing parallel arm plates having a fixing portion and a supporting portion, the supporting portion extending perpendicular from the opposing peripheral edges of the support plate, whereby each of the fixing portion is configured to be fixed to a back end of the bicycle and each of the supporting portion and the support plate extend in a direction laterally beyond a length of the bicycle; and at least one vehicle receiving assembly, configured for receiving and securing one portion of at least one vehicle to the at least one vehicle receiving assembly, attached to at least the support plate or one of the supporting portion of the pair of opposing parallel arm plates, wherein each of the fixing portions includes at least two fixing holes separated by a distance and at least two corresponding fixing elements, the bicycle is at least one of a pedal, pedal-based electric assist or electric bicycle, wherein the back end of the bicycle is a frame portion of the bicycle configured to receive the vehicle towing hitch, and the at least one vehicle is trailer and the trailer is at least one of a towed people trailer or cargo trailer and the one portion of the at least one vehicle is a tow arm, whereby each of the at least two corresponding fixing elements fix the U-shaped bracket structure to the frame portion through each of the at least two fixing holes, and the tow arm is mounted to the at least one vehicle receiving assembly, and wherein at least one of the supporting portion of the pair of opposing parallel arm plates includes at least a side assembly hole, and the at least one vehicle receiving assembly includes a coupler having a coupler through hole, a coupler fastening element, and a retaining pin, whereby the coupler fastening element assembles the coupler to the side assembly hole through the coupler through hole, and wherein the coupler is configured to receive the tow arm and the retaining pin is configured to fix the tow arm to the at least one vehicle receiving assembly.

10. The vehicle towing hitch of claim 9, wherein the bicycle further includes a pair of panniers on opposing sides of a rear wheel, and wherein a height of the vehicle towing hitch fixed to the frame portion and a length of each of the supporting portion and the support plate and the at least one vehicle receiving assembly extending in a direction laterally beyond the length of the bicycle is configured such that when the bicycle is turning left or right and towing the trailer, and a rotational operational angle of the tow arm when towing is 120 degrees, the tow arm has at least a 45 degree rotational operational angle left or right before contacting either of the pair of panniers of the bicycle or the supporting portion of either of the pair of opposing parallel arm plates.

11. A bicycle, comprising:

a vehicle towing hitch, comprising: a U-shaped bracket structure, configured for mounting to the bicycle, the U-shaped bracket structure including a support plate and a pair of opposing parallel arm plates extending perpendicular from two opposing peripheral edges of the support plate, each of the pair of opposing parallel arm plates having a fixing portion and a supporting portion, the supporting portion extending perpendicular from the opposing peripheral edges of the support plate, whereby each of the fixing portion is configured to be fixed to a back end of the bicycle and each of the supporting portion and the support plate extend in a direction laterally beyond a length of the bicycle; and at least one vehicle receiving assembly, configured for receiving and securing one portion of at least one vehicle to the at least one vehicle receiving assembly, attached to at least the support plate or one of the supporting portion of the pair of opposing parallel arm plates, wherein the bicycle is at least one of a pedal, pedal-based electric assist or electric bicycle, and the bicycle at least has a frame portion configured to receive the vehicle towing hitch, wherein the one portion of at least one vehicle has a width as measured parallel to the support plate, and at least one of the at least one vehicle receiving assembly or the U-shaped bracket structure being configured to permit the at least one vehicle receiving assembly to receive and secure the one portion of at least one vehicle for a range of widths of the one portion of at least one vehicle.

12. The bicycle of claim 11, wherein a shape of the support plate is an elongated octagonal shape and the U-shaped bracket structure further includes a pair of opposing parallel arm strengthening plates and a U-shaped strengthening top plate all extending perpendicular from three peripheral edges of the support plate between the opposing peripheral edges of the pair of opposing parallel arm plates, a second edge of each of the pair of opposing parallel arm strengthening plates extends from a third edge of each of the pair of opposing parallel arm plates and at least a portion of a third edge of each of the pair of opposing parallel arm strengthening plates extends from second edges of the U-shaped strengthening top plate, whereby the pair of opposing parallel arm strengthening plates and the U-shaped strengthening top plate together increase stiffness of the vehicle towing hitch when the at least one vehicle receiving assembly receives forces from the one portion of the at least one vehicle when stopping, starting, turning and travelling up and down inclines.

13. The bicycle of claim 11, wherein each of the fixing portion includes at least two fixing holes separated by a distance and at least two corresponding fixing elements, and the at least one vehicle is a towed bicycle and the towed bicycle is at least one of a pedal, pedal-based electric assist or electric bicycle, wherein the one portion of the at least one vehicle is a first front fork, whereby each of the at least two corresponding fixing elements fix the U-shaped bracket structure to the frame portion through each of the at least two fixing holes, and the first front fork is mounted to the at least one vehicle receiving assembly.

14. The bicycle of claim 13, wherein the support plate includes at least a first set of four assembly holes, and the at least one vehicle receiving assembly includes a first conversion shaft sleeve, a first pair of axle adapters, a pair of L-shaped mounts, and a first thru-axle quick release front fork clamp, each of the pair of L-shaped mounts includes an assembly portion having two fastening holes separated by a distance and two corresponding fastening elements and a mounting portion extending perpendicular from an edge of the assembly portion, the mounting portion including one through hole, and a size of a core diameter of the first pair of axle adapters is the same as a size of a diameter of a thru-axle of the first thru-axle quick release front fork clamp, and wherein one end of each of the first pair of axle adapters, correspond partially within opposing openings of the first conversion shaft sleeve, and the other end of each of the first pair of axle adapters, correspond partially within and through the one through hole of the mounting portion, whereby the two corresponding fastening elements of each of the pair of L-shaped mounts assemble the pair of L-shaped mounts, the first pair of axle adapters, and the first conversion shaft sleeve to the support plate through two of the at least a first set of four assembly holes, respectively, and the first thru-axle quick release front fork clamp is assembled through each of the one through hole of the mounting portion, the first pair of axle adapters, and the first conversion shaft sleeve, wherein the first thru-axle quick release front fork clamp is configured to clamp the first front fork to the at least one vehicle receiving assembly.

15. The bicycle of claim 14, wherein the support plate further includes a second set of four assembly holes, the at least one vehicle receiving assembly further includes a second conversion shaft sleeve, a second pair of axle adapters, and a second thru-axle quick release front fork clamp, and the one portion of the at least one vehicle is a second front fork having a different axle length than the first front fork, and wherein the second set of four assembly holes are disposed between the first set of four assembly holes or disposed on outer sides of the first set of four assembly holes, a length of the second conversion shaft sleeve is different from a length of the first conversion shaft sleeve, and a size of a core diameter of the second pair of axle adapters and a size of a diameter of a thru-axle of the second thru-axle quick release front fork clamp is different from the size of the core diameter of the first pair of axle adapters and the size of the diameter of the thru-axle of the first thru-axle quick release front fork clamp, whereby the second conversion shaft sleeve, the second pair of axle adapters, and the second thru-axle quick release front fork clamp, is interchangeable with the first conversion shaft sleeve, the first pair of axle adapters, and the first thru-axle quick release front fork clamp, and the two corresponding fastening elements of each of the pair of L-shaped mounts assemble the pair of L-shaped mounts, the second conversion shaft sleeve and, the second pair of axle adapters and the second thru-axle quick release front fork clamp or the first pair of axle adapters and the first thru-axle quick release front fork clamp, to the support plate through two of the at least a second set of four assembly holes, respectively, when a length of the second conversion shaft sleeve is shorter than a length of the first conversion shaft sleeve or a length of the second conversion shaft sleeve is longer than a length of the first conversion shaft sleeve, and the second thru-axle quick release front fork clamp or the first thru-axle quick release front fork clamp is assembled through each of the one through hole of the mounting portion, the second conversion shaft sleeve, and the second pair of axle adapters or the first pair of axle adapters, respectively, wherein the second thru-axle quick release front fork clamp and the first thru-axle quick release front fork clamp is configured to clamp a second front fork to the at least one vehicle receiving assembly.

16. The bicycle of claim 15, wherein the assembly portion of at least one of the pair of L-shaped mounts is assembled to the support plate facing a center of the support plate or the assembly portion of at least one of the pair of L-shaped mounts is assembled to the support plate facing an edge of the support plate, or any combination of the foregoing, whereby the direction of assembly of the assembly portion avoids contact of a portion of the first front fork or second front fork with any of the two corresponding fastening elements of each of the pair of L-shaped mounts when the first front fork or second front fork, respectfully, rotates when traveling up and down inclines.

17. The bicycle of claim 16, wherein the bicycle further includes a rear carrier rack above a rear wheel, and wherein a height of the vehicle towing hitch fixed to the frame portion and a length of each of the supporting portion and the support plate and the at least one vehicle receiving assembly extending in a direction laterally beyond the length of the bicycle is configured such that when traveling up and down inclines and towing the towed bicycle, and a mounted angle of a first front fender of the first front fork or a second front fender of the second front fork to a center of the vehicle towing hitch parallel to the ground is at least 95 degrees, the first front fender or the second front fender has at least a 35 degree rotational allowance angle before contacting the rear carrier rack of the bicycle.

18. The bicycle of claim 11, wherein each of the fixing portion includes at least two fixing holes separated by a distance and at least two corresponding fixing elements, and the at least one vehicle is trailer and the trailer is at least one of a towed people trailer or cargo trailer and the one portion of the at least one vehicle is a tow arm, whereby each of the at least two corresponding fixing elements fix the U-shaped bracket structure to the frame portion through each of the at least two fixing holes, and the tow arm is mounted to the at least one vehicle receiving assembly.

19. The bicycle of claim 18, wherein at least one of the supporting portion of the pair of opposing parallel arm plates includes at least a side assembly hole, and the at least one vehicle receiving assembly includes a coupler having a coupler through hole, a coupler fastening element, and a retaining pin, whereby the coupler fastening element assembles the coupler to the side assembly hole through the coupler through hole, and wherein the coupler is configured to receive the tow arm and the retaining pin is configured to fix the tow arm to the at least one vehicle receiving assembly.

20. The bicycle of claim 19, wherein the bicycle further includes a pair of panniers on opposing sides of a rear wheel, and wherein a height of the vehicle towing hitch fixed to the frame portion and a length of each of the supporting portion and the support plate and the at least one vehicle receiving assembly extending in a direction laterally beyond the length of the bicycle is configured such that when the bicycle is turning left or right and towing the trailer, and a rotational operational angle of the tow arm when towing is 120 degrees, the tow arm has at least a 45 degree rotational operational angle left or right before contacting either of the pair of panniers of the bicycle or the supporting portion of either of the pair of opposing parallel arm plates.

\* \* \* \* \*